US010229562B2

(12) United States Patent
Saunders et al.

(10) Patent No.: US 10,229,562 B2
(45) **Date of Patent: *Mar. 12, 2019**

(54) GAMING SYSTEM AND METHOD PROVIDING A GAME HAVING A PLAYER-ADJUSTABLE VOLATILITY

(71) Applicant: IGT, Reno, NV (US)

(72) Inventors: Brian F. Saunders, Sunnyvale, CA (US); Timothy L. Isaacson, Alameda, CA (US); Ernest M. Lafky, San Francisco, CA (US)

(73) Assignee: IGT, Las Vegas, NV (US)

( * ) Notice: Subject to any disclaimer, the term of this patent is extended or adjusted under 35 U.S.C. 154(b) by 563 days.

This patent is subject to a terminal disclaimer.

(21) Appl. No.: 13/903,613

(22) Filed: May 28, 2013

(65) Prior Publication Data

US 2014/0349734 A1 Nov. 27, 2014

Related U.S. Application Data

(63) Continuation of application No. 13/902,195, filed on May 24, 2013.

(51) Int. Cl.

| | |
|---|---|
| ***A63F 13/00*** | (2014.01) |
| ***G07F 17/34*** | (2006.01) |
| ***G07F 17/32*** | (2006.01) |

(52) U.S. Cl.

CPC .......... *G07F 17/34* (2013.01); *G07F 17/3211* (2013.01); *G07F 17/3213* (2013.01); *G07F 17/3227* (2013.01); *G07F 17/326* (2013.01)

(58) Field of Classification Search

CPC .. G07F 17/34; G07F 17/3213; G07F 17/3211; G07F 17/3227; G07F 17/326

See application file for complete search history.

(56) References Cited

U.S. PATENT DOCUMENTS

| | | | |
|---|---|---|---|
| 5,205,555 | A | 4/1993 | Hamano |
| 5,265,877 | A | 11/1993 | Boylan et al. |
| 5,630,586 | A | 5/1997 | Lowden |
| 5,722,891 | A | 3/1998 | Inoue |

(Continued)

OTHER PUBLICATIONS

Non-Final Office Action dated Nov. 6, 2014, for U.S. Appl. No. 13/902,195 (10 pages).

(Continued)

*Primary Examiner* — Lawrence Galka

(74) *Attorney, Agent, or Firm* — Neal, Gerber & Eisenberg LLP

(57) ABSTRACT

Various embodiments of the present disclosure are directed to a gaming system and method providing a game providing an award if a shape of a symbol displayed at a symbol display area corresponds to a shape of that symbol display area. Other embodiments of the present disclosure are directed to a gaming system and method providing a game having a player-adjustable volatility. In certain embodiments, the game is the above-described game, while in other embodiments, the game is a different game. Generally, in certain such embodiments, the gaming system enables a player to tailor the overall volatility of a play of the game to the player's preference by selecting a desired combination of symbol display areas to employ for a play of the game.

26 Claims, 15 Drawing Sheets

(56) References Cited

U.S. PATENT DOCUMENTS

| | | | |
|---|---|---|---|
| 5,788,573 | A * | 8/1998 | Baerlocher ............ G07F 17/32 273/138.2 |
| 6,062,981 | A | 5/2000 | Luciano |
| 6,095,921 | A | 8/2000 | Walker et al. |
| 6,113,492 | A | 9/2000 | Walker et al. |
| 6,174,235 | B1 | 1/2001 | Walker et al. |
| 6,238,288 | B1 | 5/2001 | Walker et al. |
| 6,241,607 | B1 * | 6/2001 | Payne .................... G07F 17/34 273/143 R |
| 6,290,603 | B1 | 9/2001 | Luciano, Jr. |
| 6,309,300 | B1 | 10/2001 | Glavich |
| 6,315,291 | B1 | 11/2001 | Moody |
| 6,315,664 | B1 | 11/2001 | Baerlocher et al. |
| 6,319,124 | B1 | 11/2001 | Baerlocher et al. |
| 6,364,313 | B1 | 4/2002 | Moody |
| 6,364,767 | B1 | 4/2002 | Brossard et al. |
| 6,375,570 | B1 | 4/2002 | Poole |
| 6,413,162 | B1 * | 7/2002 | Baerlocher ......... G07F 17/3202 273/143 R |
| 6,439,995 | B1 | 8/2002 | Hughs-Baird et al. |
| 6,450,883 | B1 | 9/2002 | O'Halloran |
| 6,468,156 | B1 | 10/2002 | Hughs-Baird et al. |
| 6,511,375 | B1 | 1/2003 | Kaminkow |
| 6,514,141 | B1 | 2/2003 | Kaminkow et al. |
| 6,558,254 | B2 | 5/2003 | Baelocher et al. |
| 6,561,899 | B2 | 5/2003 | Vancura |
| 6,561,900 | B1 | 5/2003 | Baerlocher et al. |
| 6,561,902 | B1 | 5/2003 | Walker et al. |
| 6,565,433 | B1 | 5/2003 | Baerlocher et al. |
| 6,569,013 | B1 | 5/2003 | Taylor |
| 6,579,178 | B1 | 6/2003 | Walker et al. |
| 6,582,307 | B2 | 6/2003 | Webb |
| 6,595,854 | B2 | 7/2003 | Hughs-Baird et al. |
| 6,599,185 | B1 | 7/2003 | Kaminkow et al. |
| 6,599,192 | B1 | 7/2003 | Baerlocher et al. |
| 6,602,137 | B2 | 8/2003 | Kaminkow et al. |
| 6,609,971 | B2 | 8/2003 | Vancura |
| 6,634,945 | B2 | 10/2003 | Glavich et al. |
| 6,672,960 | B1 | 1/2004 | B-Jensen |
| 6,676,516 | B2 | 1/2004 | Baerlocher et al. |
| 6,692,356 | B2 | 2/2004 | Baerlocher et al. |
| 6,695,700 | B2 | 2/2004 | Walker et al. |
| 6,702,675 | B2 | 3/2004 | Poole et al. |
| 6,712,693 | B1 | 3/2004 | Hettinger |
| 6,722,981 | B2 | 4/2004 | Kaminkow et al. |
| 6,722,982 | B2 | 4/2004 | Kaminkow et al. |
| 6,731,313 | B1 | 5/2004 | Kaminkow |
| 6,733,386 | B2 | 5/2004 | Cuddy et al. |
| 6,746,016 | B2 | 6/2004 | Perrie et al. |
| 6,749,502 | B2 | 6/2004 | Baerlocher |
| 6,749,504 | B2 | 6/2004 | Hughs-Baird |
| 6,758,750 | B2 | 7/2004 | Baerlocher et al. |
| 6,769,983 | B2 | 8/2004 | Slomiany |
| 6,780,107 | B2 | 8/2004 | Baerlocher et al. |
| 6,783,457 | B2 | 8/2004 | Hughs-Baird et al. |
| 6,802,778 | B1 | 10/2004 | Lemay et al. |
| 6,817,944 | B2 | 11/2004 | Kaminkow et al. |
| 6,835,133 | B2 | 12/2004 | Baerlocher et al. |
| 6,837,788 | B2 | 1/2005 | Cannon |
| 6,843,721 | B2 | 1/2005 | Vancura |
| 6,843,722 | B2 | 1/2005 | Webb |
| 6,852,028 | B2 | 2/2005 | Vancura |
| 6,852,030 | B2 | 2/2005 | Baerlocher |
| 6,855,054 | B2 | 2/2005 | White et al. |
| 6,875,108 | B1 | 4/2005 | Hughs-Baird |
| 6,877,745 | B1 | 4/2005 | Walker et al. |
| 6,890,255 | B2 | 5/2005 | Jarvis et al. |
| 6,899,620 | B2 | 5/2005 | Kaminkow et al. |
| 6,905,405 | B2 | 6/2005 | McClintic |
| 6,913,533 | B2 | 7/2005 | Cuddy et al. |
| 6,918,832 | B2 | 7/2005 | Baerlocher et al. |
| 6,918,834 | B2 | 7/2005 | Vancura |
| 6,929,545 | B2 | 8/2005 | Vancura |
| 6,932,701 | B2 | 8/2005 | Glavich et al. |
| 6,939,223 | B1 | 9/2005 | Jones |
| 6,958,013 | B2 | 10/2005 | Miereau et al. |
| 6,964,416 | B2 | 11/2005 | McClintic et al. |
| 6,966,833 | B2 | 11/2005 | Kaminkow et al. |
| 6,981,635 | B1 | 1/2006 | Hughs-Baird et al. |
| 6,988,947 | B2 | 1/2006 | Baerlocher et al. |
| 7,001,274 | B2 | 2/2006 | Baerlocher et al. |
| 7,004,834 | B2 | 2/2006 | Walker et al. |
| 7,014,560 | B2 | 3/2006 | Glavich et al. |
| 7,037,191 | B2 | 5/2006 | Rodgers et al. |
| 7,040,983 | B2 | 5/2006 | Dolloff et al. |
| 7,040,984 | B2 | 5/2006 | Mead |
| 7,056,213 | B2 | 6/2006 | Ching et al. |
| 7,056,214 | B2 | 6/2006 | Miereau et al. |
| 7,059,967 | B2 | 6/2006 | Baerlocher |
| 7,074,127 | B2 | 7/2006 | Cuddy et al. |
| 7,090,580 | B2 | 8/2006 | Rodgers et al. |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,128,646 | B2 | 10/2006 | Baerlocher et al. |
| 7,160,186 | B2 | 1/2007 | Cuddy et al. |
| 7,160,188 | B2 | 1/2007 | Kaminkow et al. |
| 7,172,506 | B2 | 2/2007 | Baerlocher et al. |
| 7,182,689 | B2 | 2/2007 | Hughs-Baird et al. |
| 7,198,569 | B2 | 4/2007 | Wolf et al. |
| 7,235,011 | B2 | 6/2007 | Randall et al. |
| 7,247,096 | B2 | 7/2007 | Vancura |
| 7,264,545 | B2 | 9/2007 | Maya et al. |
| 7,273,415 | B2 | 9/2007 | Cregan et al. |
| 7,275,988 | B2 | 10/2007 | Aida et al. |
| 7,281,977 | B2 | 10/2007 | Jones |
| 7,294,055 | B2 | 11/2007 | Baerlocher et al. |
| 7,300,348 | B2 | 11/2007 | Kaminkow et al. |
| 7,303,469 | B2 | 12/2007 | Kaminkow |
| 7,306,519 | B2 | 12/2007 | Baerlocher |
| 7,309,281 | B2 | 12/2007 | Baerlocher et al. |
| 7,309,282 | B2 | 12/2007 | Baerlocher et al. |
| 7,311,603 | B2 | 12/2007 | Walker et al. |
| 7,314,409 | B2 | 1/2008 | Maya et al. |
| 7,316,609 | B2 | 1/2008 | Dunn et al. |
| 7,326,115 | B2 * | 2/2008 | Baerlocher ............ G07F 17/32 463/1 |
| 7,331,862 | B2 | 2/2008 | Rodgers et al. |
| 7,331,866 | B2 | 2/2008 | Rodgers et al. |
| 7,338,367 | B2 | 3/2008 | Kaminkow et al. |
| 7,338,369 | B2 | 3/2008 | Mierau et al. |
| 7,341,512 | B2 | 3/2008 | Dolloff et al. |
| 7,351,141 | B2 | 4/2008 | Rodgers et al. |
| 7,371,168 | B2 | 5/2008 | Bilyeu et al. |
| 7,371,174 | B2 | 5/2008 | Baerlocher |
| 7,377,849 | B2 | 5/2008 | Baerlocher et al. |
| 7,399,226 | B2 | 7/2008 | Mishra |
| 7,399,227 | B2 | 7/2008 | Michaelson et al. |
| 7,402,102 | B2 | 7/2008 | Marks et al. |
| 7,402,103 | B2 | 7/2008 | Baerlocher |
| 7,413,513 | B2 | 8/2008 | Nguyen et al. |
| 7,452,272 | B2 | 11/2008 | Walker et al. |
| 7,470,186 | B2 | 12/2008 | Cannon |
| 7,494,412 | B2 | 2/2009 | Baerlocher |
| 7,513,826 | B2 | 4/2009 | Cuddy |
| 7,526,736 | B2 | 4/2009 | Kaminkow et al. |
| 7,544,129 | B2 | 6/2009 | Baerlocher |
| 7,547,252 | B2 | 6/2009 | Peterson et al. |
| 7,553,230 | B2 | 6/2009 | Cannon |
| 7,563,167 | B2 | 7/2009 | Walker et al. |
| 7,566,267 | B2 | 7/2009 | Vancura |
| 7,566,271 | B2 | 7/2009 | Hostetler et al. |
| 7,578,736 | B2 | 8/2009 | Baerlocher et al. |
| 7,585,218 | B2 | 9/2009 | Mend et al. |
| 7,585,219 | B2 | 9/2009 | Randall et al. |
| 7,588,496 | B2 | 9/2009 | Van Asdale |
| 7,591,722 | B2 | 9/2009 | Baerlocher et al. |
| 7,591,724 | B2 | 9/2009 | Baerlocher |
| 7,601,058 | B2 | 10/2009 | Slomiany |
| 7,607,976 | B2 | 10/2009 | Baerlocher et al. |
| 7,607,977 | B2 | 10/2009 | Baerlocher et al. |
| 7,611,406 | B2 | 11/2009 | Fuller |
| 7,621,809 | B2 | 11/2009 | Baerlocher et al. |
| 7,658,673 | B2 | 2/2010 | Baerlocher et al. |

(56) References Cited

U.S. PATENT DOCUMENTS 7,666,081 B2 2/2010 Baerlocher et al.
7,666,085 B2 2/2010 Vorias et al.
7,674,172 B2 3/2010 Miltenberger et al.
7,682,241 B2 3/2010 Baerlocher
7,690,981 B2 4/2010 Ching et al.
7,690,986 B2 4/2010 Ching et al.
7,695,363 B2 4/2010 Gilliland et al.
7,699,699 B2 4/2010 Gilliland et al.
7,708,630 B2 5/2010 Nicely
7,717,787 B2 5/2010 Walker et al.
7,727,061 B2 6/2010 Taylor
7,740,534 B2 6/2010 Walker et al.
7,740,536 B2 6/2010 Pederson et al.
7,744,454 B2 6/2010 Mierau et al.
7,749,070 B2 7/2010 Baerlocher et al.
7,753,773 B2 7/2010 Baerlocher et al.
7,771,274 B2 8/2010 Walker et al.
7,775,874 B2 8/2010 Ching et al.
7,785,188 B2 8/2010 Cannon
7,806,760 B2 10/2010 Baerlocher
7,824,263 B2 11/2010 Baerlocher
7,828,648 B2 11/2010 Jackson
7,833,095 B2 11/2010 Cuddy et al.
7,837,554 B2 11/2010 Kaminkow et al.
7,850,171 B2 12/2010 Bontempo et al.
7,850,521 B2 12/2010 Rodgers et al.
7,854,654 B2 12/2010 Baerlocher et al.
7,857,695 B2 12/2010 Rodgers et al.
7,862,423 B2 1/2011 Walker et al.
7,867,074 B2 1/2011 Gerrard et al.
7,874,908 B2 1/2011 Walker et al.
7,874,912 B2 1/2011 Cregan et al.
7,887,409 B2 2/2011 Baerlocher et al.
7,892,093 B2 2/2011 Kniesteadt et al.
7,901,282 B2 3/2011 Cannon
7,914,373 B2 3/2011 Webb et al.
7,942,737 B2 5/2011 Cregan et al.
7,963,841 B2 6/2011 Baerlocher et al.
7,976,382 B2 7/2011 Benbrahim
8,002,621 B2 8/2011 Mattice et al.
8,002,625 B2 8/2011 Maya
8,006,978 B2 8/2011 Bontempo et al.
8,007,357 B2 8/2011 Cuddy et al.
8,016,289 B2 9/2011 Walker et al.
8,016,657 B2 9/2011 Walker et al.
8,021,222 B2 9/2011 Walker et al.
8,021,226 B2 9/2011 Souza et al.
8,021,230 B2 9/2011 Baerlocher et al.
8,025,561 B2 9/2011 Reddicks et al.
8,109,821 B2 2/2012 Kovacs et al.
8,235,808 B2 8/2012 Baerlocher et al.
8,251,791 B2 8/2012 Baerlocher et al.
8,287,357 B2 10/2012 Evans
8,430,747 B2 4/2013 Kniesteadt et al.
8,545,307 B2 10/2013 Nicely et al.
8,562,416 B2 10/2013 Baerlocher et al.
8,574,060 B2 11/2013 Nakamura et al.
8,708,810 B2 4/2014 Nakamura
9,028,317 B2 5/2015 Frick et al.
9,245,407 B2 1/2016 Saunders et al.
2002/0042294 A1* 4/2002 Pau .................... G07F 17/3244 463/16
2002/0151354 A1 10/2002 Boesen et al.
2003/0083120 A1* 5/2003 DeWall ............... G07F 17/3244 463/16
2003/0130028 A1* 7/2003 Aida ................... G07F 17/3244 463/20
2004/0043811 A1* 3/2004 Seelig ................. G07F 17/3211 463/16
2004/0166924 A1 8/2004 Jackson
2004/0185928 A1* 9/2004 Baerlocher ............ G07F 17/32 463/16
2005/0020351 A1 1/2005 Baerlocher et al.
2005/0054418 A1 3/2005 Baerlocher
2005/0054435 A1 3/2005 Rodgers et al.
2005/0070353 A1* 3/2005 Webb ...................... G07F 17/32 463/16
2005/0130737 A1* 6/2005 Englman ................ G07F 17/32 463/25
2005/0164777 A1 7/2005 Daly
2005/0192081 A1 9/2005 Marks et al.
2005/0208992 A1 9/2005 Randall
2005/0215307 A1 9/2005 Jarvis et al.
2006/0030401 A1 2/2006 Mead et al.
2006/0052157 A1 3/2006 Walker et al.
2006/0052163 A1 3/2006 Aida
2006/0073873 A1* 4/2006 Rodgers .................. G07F 17/34 463/20
2006/0084493 A1* 4/2006 Pederson ................ G07F 17/34 463/20
2006/0111173 A1* 5/2006 Yang ....................... G07F 17/32 463/20
2006/0116195 A1 6/2006 Baerlocher et al.
2006/0183528 A1 8/2006 Rodgers et al.
2006/0237905 A1 10/2006 Nicely et al.
2006/0252515 A1 11/2006 Walker et al.
2007/0004508 A1 1/2007 Walker et al.
2007/0021185 A1 1/2007 Walker et al.
2007/0060252 A1* 3/2007 Taylor ................. G07F 17/3262 463/16
2007/0060255 A1* 3/2007 Baerlocher ......... G07F 17/3213 463/16
2007/0060273 A1* 3/2007 Webb ...................... G07F 17/32 463/16
2007/0117606 A1 5/2007 Baerlocher et al.
2007/0135204 A1 6/2007 Nicely
2007/0149267 A1 6/2007 Ross et al.
2007/0184887 A1 8/2007 Cannon
2007/0243921 A1 10/2007 Fanjoy et al.
2008/0096670 A1 4/2008 Baerlocher et al.
2008/0102916 A1 5/2008 Kovacs et al.
2008/0102923 A1* 5/2008 Esses ...................... G07F 17/34 463/20
2008/0102952 A1 5/2008 Walker et al.
2008/0113771 A1 5/2008 Baerlocher et al.
2008/0146321 A1 6/2008 Parente
2008/0153564 A1 6/2008 Baerlocher et al.
2008/0188287 A1 8/2008 Schlegel et al.
2008/0200238 A1 8/2008 Mishra
2008/0242398 A1* 10/2008 Harris ..................... G07F 17/32 463/25
2008/0254894 A1 10/2008 Michaelson et al.
2008/0272541 A1 11/2008 Walker et al.
2008/0280673 A1 11/2008 Marks et al.
2008/0287178 A1 11/2008 Berman et al.
2009/0005145 A1 1/2009 White
2009/0042652 A1 2/2009 Baerlocher et al.
2009/0088239 A1 4/2009 Iddings et al.
2009/0104959 A1 4/2009 Caputo et al.
2009/0111560 A1 4/2009 Davis et al.
2009/0124316 A1 5/2009 Baerlocher et al.
2009/0124347 A1 5/2009 Rodgers et al.
2009/0253492 A1 10/2009 Caputo et al.
2010/0004044 A1 1/2010 Slomiany
2010/0041461 A1* 2/2010 Demsetz ............. G07F 17/3262 463/20
2010/0048282 A1 2/2010 Nicely et al.
2010/0056254 A1 3/2010 Jackson
2010/0120487 A1 5/2010 Walker et al.
2010/0120489 A1 5/2010 Meyer
2010/0120496 A1 5/2010 Hoffman et al.
2010/0120501 A1 5/2010 Hoffman et al.
2010/0120505 A1 5/2010 Caputo et al.
2010/0120506 A1 5/2010 Davis et al.
2010/0120507 A1 5/2010 Rodgers et al.
2010/0120508 A1* 5/2010 Vann ................... G07F 17/3202 463/20
2010/0124969 A1* 5/2010 Hughes ............... G07F 17/3265 463/20
2010/0124971 A1 5/2010 Baerlocher et al.
2010/0124972 A1* 5/2010 Rodgers .................. G07F 17/34 463/20

(56) References Cited

U.S. PATENT DOCUMENTS

2010/0144419 A1 6/2010 Miltenberger et al.
2010/0144422 A1 6/2010 Jackson
2010/0160031 A1 6/2010 Gilliland et al.
2010/0210338 A1 8/2010 Taylor
2010/0227665 A1 9/2010 Nicely
2011/0028201 A1 2/2011 Warner et al.
2011/0034236 A1 2/2011 Jackson
2011/0045906 A1 2/2011 Berman et al.
2011/0111824 A1 5/2011 Cuddy et al.
2011/0111826 A1 5/2011 Baerlocher et al.
2011/0111828 A1* 5/2011 Caputo .................. G07F 17/34 463/20
2011/0118010 A1 5/2011 Brune
2011/0183750 A1 7/2011 Cregan et al.
2012/0283006 A1 11/2012 Baerlocher et al.
2012/0302323 A1* 11/2012 Gagner ............... G07F 17/3202 463/25
2013/0059638 A1* 3/2013 Nicely .................. G07F 17/322 463/17
2013/0316781 A1* 11/2013 Pececnik ............. G07F 17/3202 463/17
2014/0080565 A1* 3/2014 Pececnik ............... G07F 17/326 463/17
2014/0087821 A1* 3/2014 Zoltewicz ............. G07F 17/326 463/20
2014/0309011 A1* 10/2014 Pawloski ................ G07F 17/34 463/20

OTHER PUBLICATIONS

Description of Operation Board Game, Board Game Geek Website, available at http://www.boardgamegeek. com/boardgame/3737/ operation, printed May 20, 2013 (5 pages).

* cited by examiner

GAMING SYSTEM AND METHOD PROVIDING A GAME HAVING A PLAYER-ADJUSTABLE VOLATILITY

PRIORITY CLAIM

This patent application is a continuation of, and claims priority to and the benefit of, U.S. patent application Ser. No. 13/902,195, filed on May 24, 2013, the entire contents of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming systems, an amount of a wager placed on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

Certain known gaming systems provide predictable, non-interactive, and non-customizable game play, such as by providing a spin of three reels and determining any award(s) based on whether any of a plurality of winning symbol combinations are displayed along the wagered-on payline(s). While initially enjoyable, the predictable, passive, and non-customizable nature of such game play becomes monotonous and boring for certain players after a certain amount time. A continuing need thus exists to provide new, exciting, and engaging gaming systems that include different ways of determining awards, invite player interaction, and enable a player to tailor game play to the player's preferences.

SUMMARY

Various embodiments of the present disclosure are directed to a gaming system and method providing a game providing an award if a shape of a symbol displayed at a symbol display area corresponds to a shape of that symbol display area.

More specifically, in one embodiment, the gaming system displays a plurality of symbol display areas. Each of the symbol display areas is associated with: (a) one of a plurality of different shapes, and (b) one of a plurality of symbol generators (such as reels) associated with a plurality of symbols. For each of a designated quantity of at least one of the symbol display areas, the gaming system: (a) generates one of the symbols associated with the symbol generator associated with that symbol display area, (b) displays the generated symbol at that symbol display area; and (c) determines any award based, at least in part, on whether a shape of the symbol displayed at that symbol display area corresponds to the shape associated with that symbol display area. The gaming system provides any determined awards.

Other embodiments of the present disclosure are directed to a gaming system and method providing a game having a player-adjustable volatility. In certain embodiments, the game is the above-described game, while in other embodiments, the game is a different game. Generally, in certain such embodiments, the gaming system enables a player to tailor the overall volatility of a play of the game to the player's preference by selecting a desired combination of symbol display areas to employ for a play of the game.

More specifically, in one embodiment, the gaming system displays a plurality of symbol display areas. Each of the symbol display areas is associated with one of a plurality of different volatilities. The gaming system receives a selection of one or more of the displayed symbol display areas from a player. The gaming system provides a play of the game employing the selected symbol display areas and having an overall volatility based on the volatilities associated with the employed symbol display areas.

In another embodiment, the gaming system displays a plurality of symbol display areas. Each of the symbol display areas is associated with: (a) one of a plurality of different shapes, (b) one of a plurality of symbol generators (such as reels) associated with a plurality of symbols, and (c) one of a plurality of different volatilities. The gaming system receives a selection of one or more of the displayed symbol display areas from a player to employ for a play of a game. The play of the game has an overall volatility based on the volatilities associated with the selected symbol display areas. For the play of the game, for each of the selected symbol display areas, the gaming system: (a) generates one of the symbols associated with the symbol generator associated with that symbol display area; (b) displays the generated symbol at that symbol display area; and (c) determines any award based, at least in part, on whether a shape of the symbol displayed at that symbol display area corresponds to the shape associated with that symbol display area. The gaming system provides any determined awards for the play of the game.

It should thus be appreciated that the gaming system and method of the present disclosure provide new and different ways of determining awards, enabling a player to interact with the gaming system and affect game play, and tailor game play to the player's preferences, thereby increasing player enjoyment, entertainment, and excitement.

Additional features and advantages are described herein, and will be apparent from, the following Detailed Description and the Figures.

DETAILED DESCRIPTION

Providing an Award if a Shape of a Symbol Displayed at a Symbol Display Area Corresponds to a Shape of that Symbol Display Area Various embodiments of the present disclosure are directed to a gaming system and method providing a game providing an award if a shape of a symbol displayed at a symbol display area corresponds to a shape of that symbol display area. While the game of the present disclosure is employed as a primary game in the embodiments described below, it should be appreciated that the game may additionally or alternatively be employed as or in association with a bonus game or a secondary game. Moreover, while any credit balances, any wagers, and any awards are displayed as amounts of monetary credits or currency in the embodiments described below, one or more of such credit balances, such wagers, and such awards may be for non-monetary credits, promotional credits, and/or player tracking points or credits.

Figure 1A:
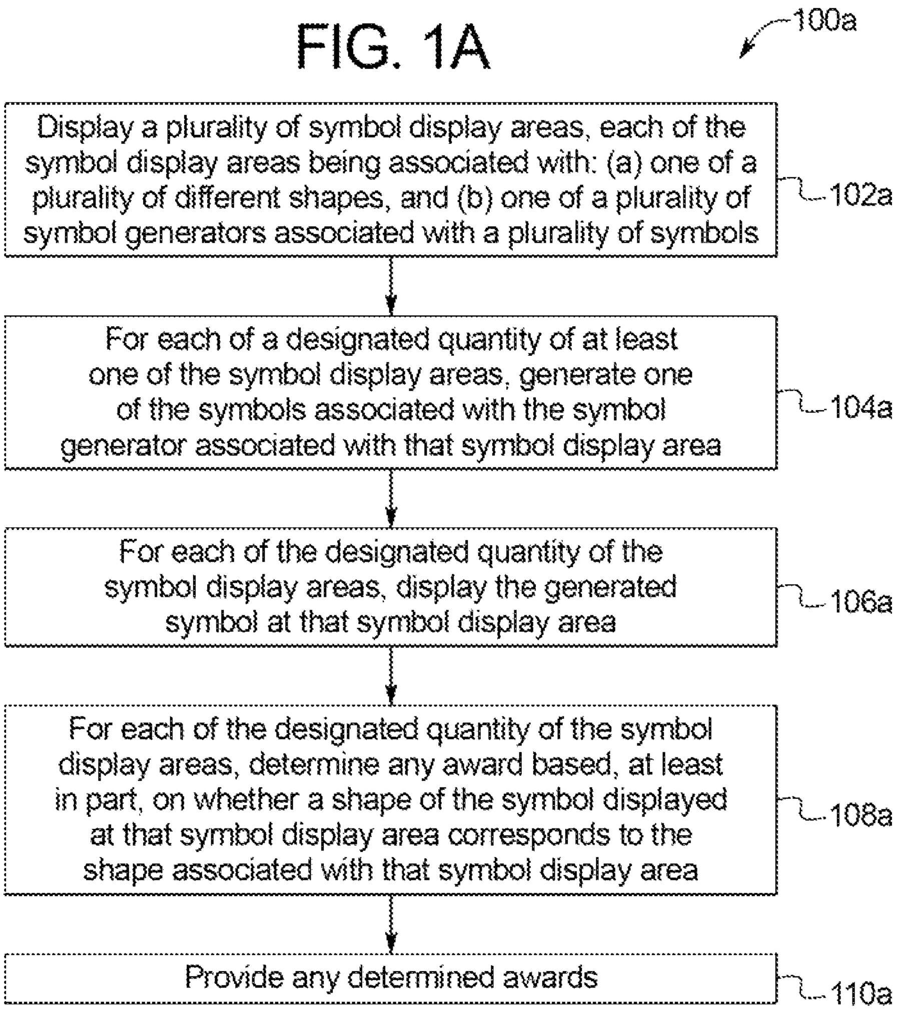
FIG. 1A is a flowchart illustrating a method of operating an example embodiment of the gaming system of the present disclosure.

FIG. 1A illustrates a flowchart of an example process or method 100*a* of operating the gaming system of the present disclosure. In various embodiments, process 100*a* is represented by a set of instructions stored in one or more memories and executed by one or more processors. Although process 100*a* is described with reference to the flowchart shown in FIG. 1A, it should be appreciated that many other processes of performing the acts associated with this illustrated process 100*a* may be employed. For example, the order of certain of the illustrated blocks may be changed, certain of the illustrated blocks may be optional, and/or certain of the illustrated blocks may not be employed.

In this example embodiment, the gaming system displays a plurality of symbol display areas, as indicated by block 102*a*. Each of the symbol display areas is associated with: (a) one of a plurality of different shapes, and (b) one of a plurality of symbol generators (such as reels) associated with a plurality of symbols. For each of a designated quantity of at least one of the symbol display areas, the gaming system: (a) generates one of the symbols associated with the symbol generator associated with that symbol display area, as indicated by block 104*a*; (b) displays the generated symbol at that symbol display area, as indicated by block 106*a*; and (c) determines any award based, at least in part, on whether a shape of the symbol displayed at that symbol display area corresponds to the shape associated with that symbol display area, as indicated by block 108*a*. The gaming system provides any determined awards, as indicated by block 110*a*.

Figure 2A:
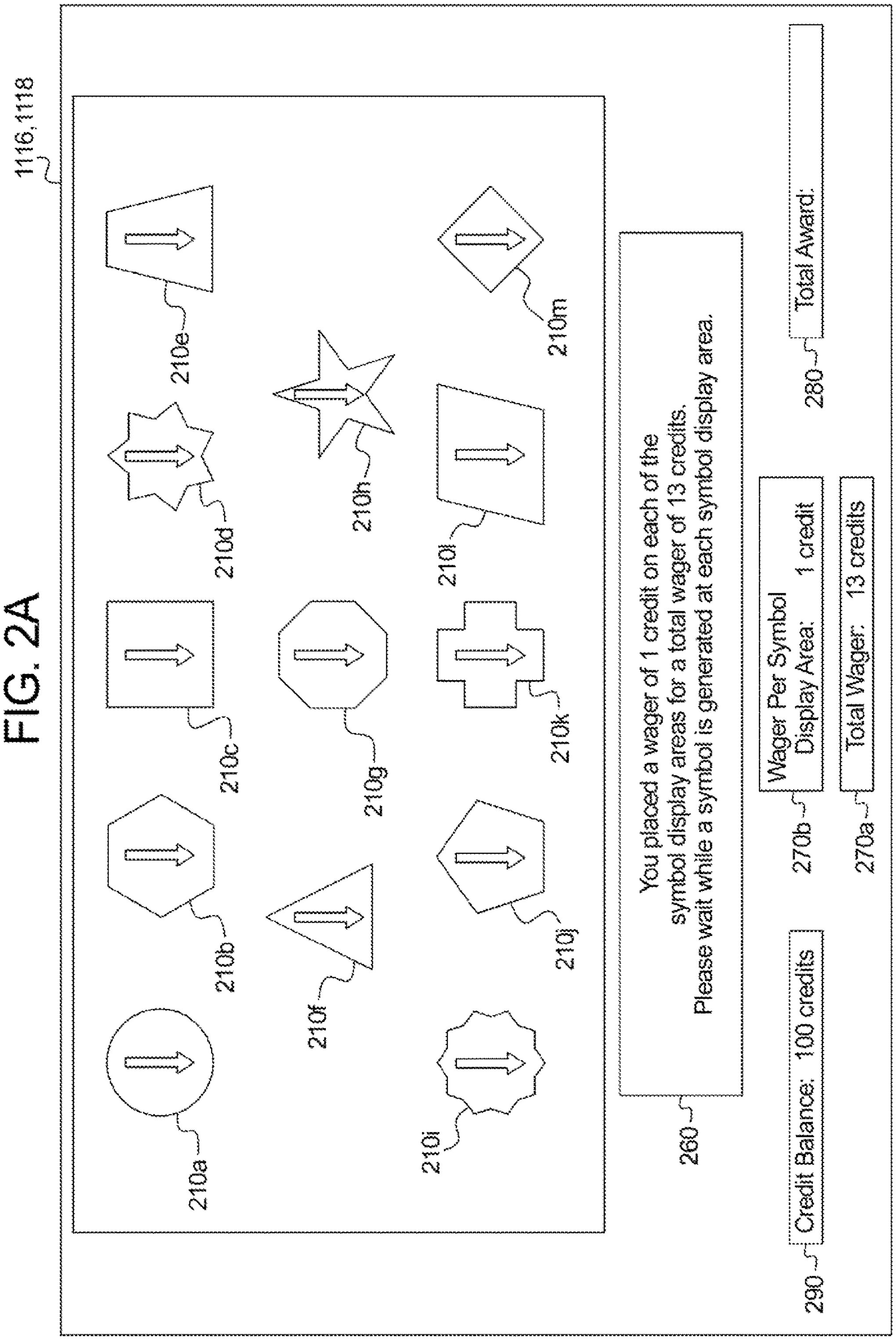
FIGS. 2A and 2B illustrate screen shots of an example embodiment of the gaming system of the present disclosure providing a play of the game according to the method of FIG. 1A.
Figure 2B:
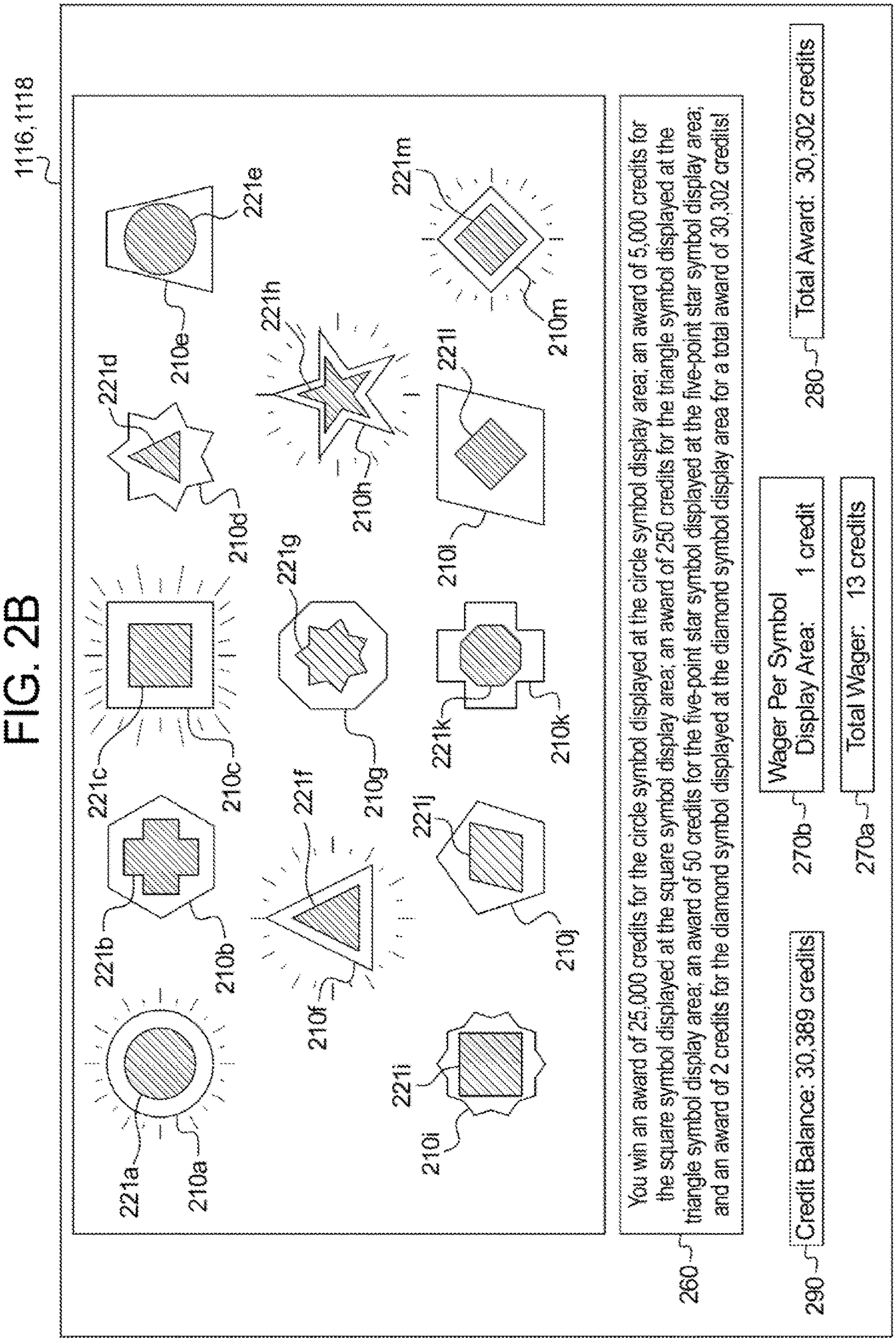

FIGS. 2A and 2B illustrate screen shots of an example embodiment of the gaming system of the present disclosure providing a play of the game according to process 100*a* described above. In this example embodiment, the gaming system displays (such as on a display device 1116 or 1118, described below) a plurality of symbol display areas 210*a*, 210*b*, 210*c*, 210*d*, 210*e*, 210*f*, 210*g*, 210*h*, 210*i*, 210*j*, 210*k*, 210*l*, and 210*m*. Each of the symbol display areas has or is otherwise associated with one of a plurality of different shapes. More specifically, in this example embodiment: (a) symbol display area 210*a* has a circle shape, (b) symbol display area 210*b* has a hexagon shape, (c) symbol display area 210*c* has a square shape, (d) symbol display area 210*d* has a seven-point star shape, (e) symbol display area 210*e* has a trapezoid shape, (f) symbol display area 210*f* has a triangle shape, (g) symbol display area 210*g* has an octagon shape, (h) symbol display area 210*h* has a five-point star shape, (i) symbol display area 210*i* has a ten-point star shape, (j) symbol display area 210*j* has a pentagon shape, (k) symbol display area 210*k* has a cross shape, (l) symbol display area 210*l* has a parallelogram shape, and (m) symbol display area 210*m* has a diamond shape. It should be appreciated that any suitable shapes may be employed.

The symbol display areas are each associated with separate, independent symbol generators, which are independent reels in this example embodiment, each of which includes or is otherwise associated with a plurality of symbols. For a play of the game, each reel is configured to display one of the symbols on that reel at the symbol display area with which that reel is associated. In this example embodiment, each of the reels includes a different combination of the following symbols: a Circle symbol, a Hexagon symbol, a Square symbol, a Seven-Point Star symbol, a Trapezoid symbol, a Triangle symbol, an Octagon symbol, a Five-Point Star symbol, a Ten-Point Star symbol, a Pentagon symbol, a Cross symbol, a Parallelogram symbol, and a Diamond symbol.

In this example embodiment, each symbol has a shape that corresponds to the shape of one of the symbol display areas. In this example embodiment, the shape of a symbol corresponds to the shape of the symbol display area at which that symbol is displayed if the shapes are identical. More specifically, in this example embodiment: (a) the circle shape of the Circle symbol corresponds to the circle shape of symbol display area 210*a*, (b) the hexagon shape of the Hexagon symbol corresponds to the hexagon shape of symbol display area 210*b*, (c) the square shape of the Square symbol corresponds to the square shape of symbol display area 210*c*, (d) the seven-point star shape of the Seven-Point Star symbol corresponds to the seven-point star shape of symbol display area 210*d*, (e) the trapezoid shape of the Trapezoid symbol corresponds to the trapezoid shape of symbol display area 210*e*, (f) the triangle shape of the Triangle symbol corresponds to the triangle shape of symbol display area 210*f*, (g) the octagon shape of the Octagon symbol corresponds to the octagon shape of symbol display area 210*g*, (h) the five-point star shape of the Five-Point Star symbol corresponds to the five-point star shape of symbol display area 210*h*, (i) the ten-point star shape of the Ten-Point Star symbol corresponds to the ten-point star shape of symbol display area 210*i*, (j) the pentagon shape of the Pentagon symbol corresponds to the pentagon shape of symbol display area 210*j*, (k) the cross shape of the Cross symbol corresponds to the cross shape of symbol display area 210*k*, (l) the parallelogram shape of the Parallelogram symbol corresponds to the parallelogram shape of symbol display area 210*l*, and (m) the diamond shape of the Diamond symbol corresponds to the diamond shape of symbol display area 210*m*. It should be appreciated that shapes may correspond to one another in any suitable manner.

For a play of the game in this example embodiment, after receiving a wager, for each of the symbol display areas, the gaming system generates one of the symbols on the reel associated with that symbol display area and displays the generated symbol at that symbol display area. The gaming system then determines any award associated with that symbol display area based, at least in part, on whether the shape of the symbol displayed at that symbol display area corresponds to the shape of that symbol display area. More specifically, in this example embodiment, the gaming system determines and provides an award associated with a symbol display area if the shape of the symbol displayed at that symbol display area corresponds to the shape of that symbol display area. Thus, in this example embodiment, for each symbol display area, the play of the game results in a winning outcome for that symbol display area if the shape of the symbol displayed at that symbol display area corresponds to the shape of that symbol display area. It should be appreciated that, in this example embodiment, there are as many independent outcomes for the play of the game as there are symbol display areas.

Table 1 below lists, for each symbol display area in this example embodiment, information associated with that symbol display area including: (a) the shape of that symbol display area (e.g., the circle shape); (b) the distribution of symbols on the reel associated with that symbol display area (e.g., 39 of the 1,000,000 total symbols on the reel are the Circle symbol and the remaining 999,961 of the 1,000,000 total symbols on the reel are any suitable combination of the remaining (i.e., non-Circle) symbols); (c) the award (for a 1 credit wager) associated with the play of the game resulting in a winning outcome for that symbol display area (e.g., the Circle symbol being generated and displayed at that symbol display area, which has the circle shape); (d) the average expected payback percentage associated with that symbol display area for the play of the game (e.g., 97%); and (e) the average number of plays of the game that occur per one play of the game resulting in a winning outcome for that symbol display area (e.g., 25,773.2 plays per winning outcome). It should be appreciated from Table 1 that the odds of a given symbol being generated may differ between reels. For instance, the reel associated with the symbol display area having the circle shape includes 39 Circle symbols, while the reels associated with the symbol display area having the hexagon shape may include 100,000 Circle symbols.

TABLE 1

Symbol Display Area Information for 97% Average Expected Payback Percentage

| Shape Associated with Symbol Display Area | Symbol Distribution of Associated Reel | Award for Winning Outcome (1 credit wager) | AEP % | Average Number of Plays Per Winning Outcome |
|---|---|---|---|---|
| Circle | Circle-39<br>All others-999.961 | 25,000 credits | 97% | 25,773.2 |
| Hexagon | Hexagon-97<br>All others-999,903 | 10,000 credits | 97% | 10,309.3 |
| Square | Square-194<br>All others-999,806 | 5,000 credits | 97% | 5,154.6 |

TABLE 1-continued

| Symbol Display Area Information for 97% Average Expected Payback Percentage | | | | |
|---|---|---|---|---|
| Shape Associated with Symbol Display Area | Symbol Distribution of Associated Reel | Award for Winning Outcome (1 credit wager) | AEP % | Average Number of Plays Per Winning Outcome |
| Seven-Point Star | Seven-Point Star-970<br>All others-999,030 | 1,000 credits | 97% | 1,030.9 |
| Trapezoid | Trapezoid-1,940<br>All others-998,060 | 500 credits | 97% | 515.5 |
| Triangle | Triangle-3,880<br>All others-996,120 | 250 credits | 97% | 257.7 |
| Octagon | Octagon-9,700<br>All others-990,300 | 100 credits | 97% | 103.1 |
| Five-Point Star | Five-Point Star-19,400<br>All others-980,600 | 50 credits | 97% | 51.5 |
| Ten-Point Star | Ten-Point Star-38,800<br>All others-961,200 | 25 credits | 97% | 25.8 |
| Pentagon | Pentagon-97,000<br>All others-903,000 | 10 credits | 97% | 10.3 |
| Cross | Cross-194,000<br>All others-806,000 | 5 credits | 97% | 5.2 |
| Parallelogram | Parallelogram-323,333<br>All other-676,667 | 3 credits | 97% | 3.1 |
| Diamond | Diamond-485,000<br>All others-515,000 | 2 credits | 97% | 2.1 |

The gaming system also displays a message box 260 that displays messages or indications before, during, or after a play of the game, and a plurality of meters including: a total wager meter 270*a* that displays a total wager placed on a play of the game, a wager per symbol display area meter 270*b* that displays a portion of the total wager allocated to each symbol display area, a total award meter 280 that displays a total of any awards won during the play of the game, and a credit meter 290 that displays the player's credit balance. While in this illustrated example the gaming system indicates any awards in the form of amounts of credits, it should be appreciated that such indications may alternatively or additionally be made in the form of amounts of currency.

Turning to FIG. 2A, in this example embodiment, upon receiving a total wager of 13 credits from a player for a play of the game (as indicated by total wager meter 270*a*), the gaming system allocates 1 credit of the 13 credit total wager to each of the symbol display areas (as indicated by wager per symbol display area meter 270*b*). In this example embodiment, the gaming system requires that an equal wager be placed on each of the symbol display areas for the play of the game. The gaming system initiates a spin of the reels. The gaming system displays the following message in message box 260: "YOU PLACED A WAGER OF 1 CREDIT ON EACH OF THE SYMBOL DISPLAY AREAS FOR A TOTAL WAGER OF 13 CREDITS. PLEASE WAIT WHILE A SYMBOL IS GENERATED AT EACH SYMBOL DISPLAY AREA."

Turning to FIG. 28, the gaming system: (a) generates and displays the Circle symbol 221*a* at symbol display area 210*a*, (b) generates and displays the Cross symbol 221*b* at symbol display area 210*b*, (c) generates and displays the Square symbol 221*c* at symbol display area 210*c*, (d) generates and displays the Triangle symbol 221*d* at symbol display area 210*d*, (e) generates and displays the Circle symbol 221*e* at symbol display area 210*e*, (f) generates and displays the Triangle symbol 221*f* at symbol display area 210*f*, (g) generates and displays the Seven-Point Star symbol 221*g* at symbol display area 210*g*, (h) generates and displays the Five-Point Star symbol 221*h* at symbol display area 210*h*, (i) generates and displays the Square symbol 221*i* at symbol display area 210*i*, (j) generates and displays the Parallelogram symbol 221*j* at symbol display area 210*j*, (k) generates and displays the Octagon symbol 221*k* at symbol display area 210*k*, (l) generates and displays the Diamond symbol 221*l* at symbol display area 210*l*, and (m) generates and displays the Diamond symbol 221*m* at symbol display area 210*m*.

For each of the symbol display areas, the gaming system makes a separate, independent award determination to determine whether the play of the game results in a winning outcome for that symbol display area. More specifically, for each of the symbol display areas, the gaming system determines whether the shape of the symbol displayed at that symbol display area corresponds to the shape of that symbol display area. If so, the gaming system determines that the play of the game results in a winning outcome for that symbol display area, and determines an award associated with that symbol display area based on a suitable paytable, such as the paytable included in Table 2 below.

TABLE 2

| Example Paytable | |
|---|---|
| Shape Associated with Symbol Display Area | Award for Winning Outcome (for 1 credit wager) |
| Circle | 25,000 credits |
| Hexagon | 10,000 credits |
| Square | 5,000 credits |
| Seven-Point Star | 1,000 credits |
| Trapezoid | 500 credits |
| Triangle | 250 credits |
| Octagon | 100 credits |
| Five-Point Star | 50 credits |
| Ten-Point Star | 25 credits |
| Pentagon | 10 credits |
| Cross | 5 credits |

TABLE 2-continued

| Example Paytable | |
|---|---|
| Shape Associated with Symbol Display Area | Award for Winning Outcome (for 1 credit wager) |
| Parallelogram | 3 credits |
| Diamond | 2 credits |

In this example embodiment, the gaming system determines: (a) that the circle shape of the Circle symbol 221*a* corresponds to the circle shape of symbol display area 210*a* at which the Circle symbol 221*a* is displayed; (b) that the cross shape of the Cross symbol 221*b* does not correspond to the hexagon shape of symbol display area 210*b* at which the Cross symbol 221*b* is displayed; (c) that the square shape of the Square symbol 221*c* corresponds to the square shape of symbol display area 210*c* at which the Square symbol 221*c* is displayed; (d) that the circle shape of the Triangle symbol 221*d* does not correspond to the seven-point star shape of symbol display area 210*d* at which the Triangle symbol 221*d* is displayed; (e) that the circle shape of the Circle symbol 221*e* does not correspond to the trapezoid shape of symbol display area 210*e* at which the Circle symbol 221*e* is displayed; (f) that the triangle shape of the Triangle symbol 221*f* corresponds to the triangle shape of symbol display area 210*f* at which the Triangle symbol 221*f* is displayed; (g) that the seven-point star shape of the Seven-Point Star symbol 221*g* does not correspond to the octagon shape of symbol display area 210*g* at which the Seven-Point Star symbol 221*g* is displayed; (h) that the five-point star shape of the Five-Point symbol 221*h* corresponds to the five-point star shape of symbol display area 210*h* at which the Five-Point Star symbol 221*h* is displayed; (i) that the square shape of the Square symbol 221*i* does not correspond to the ten-point star shape of symbol display area 210*i* at which the Ten-Point Star symbol 221*i* is displayed; (j) that the parallelogram shape of the Parallelogram symbol 221*j* does not correspond to the pentagon shape of symbol display area 210*j* at which the Parallelogram symbol 221*j* is displayed; (k) that the octagon shape of the Octagon symbol 221*k* does not correspond to the cross shape of symbol display area 210*k* at which the Octagon symbol 221*k* is displayed; (l) that the diamond shape of the Diamond symbol 221*l* does not correspond to the parallelogram shape of symbol display area 210*l* at which the Diamond symbol 221*l* is displayed; and (m) that the diamond shape of the Diamond symbol 221*m* corresponds to the diamond shape of symbol display area 210*m* at which the Diamond symbol 221*m* is displayed.

Accordingly, the gaming system determines: (a) an award of 25,000 credits associated with the play of the game resulting in a winning outcome for symbol display area 210*a*; (b) an award of 5,000 credits associated with the play of the game resulting in a winning outcome for symbol display area 210*c*; (c) an award of 250 credits associated with the play of the game resulting in a winning outcome for symbol display area 210*f*; (d) an award of 50 credits associated with symbol display area 210*h*; and (e) an award of 2 credits associated with the play of the game resulting in a winning outcome for symbol display area 210*m* for a total award of 30,302 credits. The gaming system updates total award meter 280 and the player's credit balance displayed in credit meter 290 to reflect the 30,302 credit total award. The gaming system displays the following message in message box 260: "YOU WIN AN AWARD OF 25,000 CREDITS FOR THE CIRCLE SYMBOL DISPLAYED AT THE CIRCLE SYMBOL DISPLAY AREA; AN AWARD OF 5,000 CREDITS FOR THE SQUARE SYMBOL DISPLAYED AT THE SQUARE SYMBOL DISPLAY AREA; AN AWARD OF 250 CREDITS FOR THE TRIANGLE SYMBOL DISPLAYED AT THE TRIANGLE SYMBOL DISPLAY AREA; AN AWARD OF 50 CREDITS FOR THE FIVE-POINT STAR SYMBOL DISPLAYED AT THE FIVE-POINT STAR SYMBOL DISPLAY AREA; AND AN AWARD OF 2 CREDITS FOR THE DIAMOND SYMBOL DISPLAYED AT THE DIAMOND SYMBOL DISPLAY AREA FOR A TOTAL AWARD OF 30,302 CREDITS!"

Player-Adjustable Volatility

Certain embodiments of the present disclosure are directed to a gaming system and method providing a game having a player-adjustable volatility. In certain embodiments, the game is the above-described game, while in other embodiments, the game is a different game. While the game of the present disclosure is employed as a primary game in the embodiments described below, it should be appreciated that the game may additionally or alternatively be employed as or in association with a bonus game or a secondary game. Moreover, while any credit balances, any wagers, and any awards are displayed as amounts of monetary credits or currency in the embodiments described below, one or more of such credit balances, such wagers, and such awards may be for non-monetary credits, promotional credits, and/or player tracking points or credits.

Figure 1B:
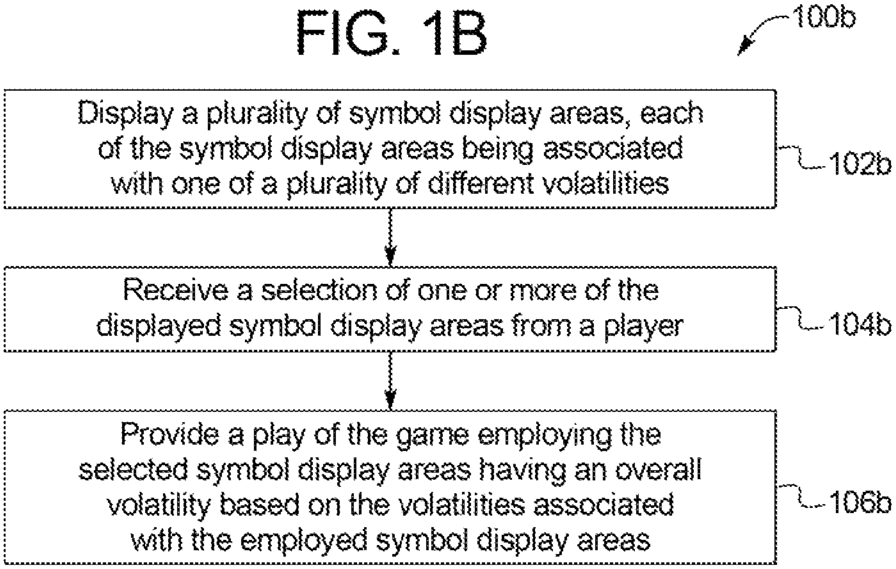
FIG. 1B is a flowchart illustrating a method of operating another example embodiment of the gaming system of the present disclosure.

FIG. 1B illustrates a flowchart of another example process or method 100*b* of operating the gaming system of the present disclosure. In various embodiments, process 100*b* is represented by a set of instructions stored in one or more memories and executed by one or more processors. Although process 100*b* is described with reference to the flowchart shown in FIG. 1B, it should be appreciated that many other processes of performing the acts associated with this illustrated process 100*b* may be employed. For example, the order of certain of the illustrated blocks may be changed, certain of the illustrated blocks may be optional, and/or certain of the illustrated blocks may not be employed.

In this example embodiment, the gaming system displays a plurality of symbol display areas, as indicated by block 102*b*. Each of the symbol display areas is associated with one of a plurality of different volatilities. The gaming system receives a selection of one or more of the displayed symbol display areas from a player, as indicated by block 104*b*. The gaming system provides a play of the game employing the selected symbol display areas and having an overall volatility based on the volatilities associated with the employed symbol display areas, as indicated by block 106*b*. Thus, in this example embodiment, the gaming system enables the player to tailor the overall volatility of the play of the game to the player's preference by selecting a desired combination of the symbol display areas.

Figure 1C:
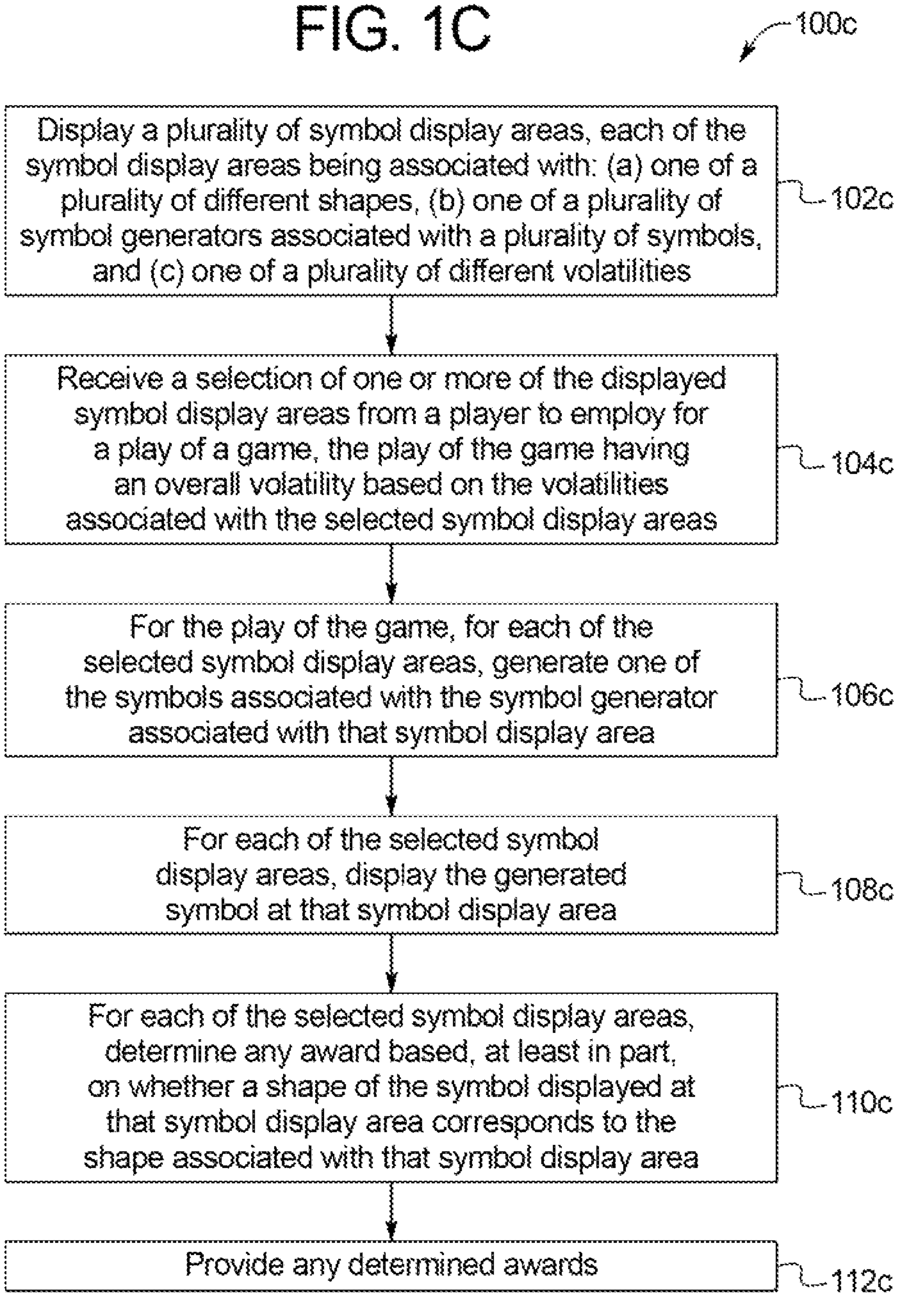
FIG. 1C is a flowchart illustrating a method of operating another example embodiment of the gaming system of the present disclosure.

FIG. 1C illustrates a flowchart of another example process or method 100*c* of operating the gaming system of the present disclosure. In various embodiments, process 100*c* is represented by a set of instructions stored in one or more memories and executed by one or more processors. Although process 100*c* is described with reference to the flowchart shown in FIG. 1C, it should be appreciated that many other processes of performing the acts associated with this illustrated process 100*c* may be employed. For example, the order of certain of the illustrated blocks may be changed, certain of the illustrated blocks may be optional, and/or certain of the illustrated blocks may not be employed.

In this example embodiment, the gaming system displays a plurality of symbol display areas, as indicated by block 102*c*. Each of the symbol display areas is associated with: (a) one of a plurality of different shapes, (b) one of a plurality of symbol generators (such as reels) associated with a plurality of symbols, and (c) one of a plurality of different volatilities. The gaming system receives a selection of one or more of the displayed symbol display areas from a player to employ for a play of a game, as indicated by block 104*c*. The play of the game has an overall volatility based on the volatilities associated with the selected symbol display areas. For the play of the game, for each of the selected symbol display areas, the gaming system: (a) generates one of the symbols associated with the symbol generator associated with that symbol display area, as indicated by block 106*c*; (b) displays the generated symbol at that symbol display area, as indicated by block 108*c*; and (c) determines any award based, at least in part, on whether a shape of the symbol displayed at that symbol display area corresponds to the shape associated with that symbol display area, as indicated by block 110*c*. The gaming system provides any determined awards for the play of the game, as indicated by block 112*c*.

It should thus be appreciated that, for a play of the game in this example embodiment, for each of the symbol display areas selected by the player to employ for the play of the game, the gaming system generates one of the symbols on the reel associated with that symbol display area and displays the generated symbol at that symbol display area. The gaming system then determines any award associated with that symbol display area based, at least in part, on whether the shape of the symbol displayed at that symbol display area corresponds to the shape of that symbol display area. In other words, in this example embodiment, the gaming system determines and provides an award associated with a symbol display area if the shape of the symbol displayed at that symbol display area corresponds to the shape of that symbol display area. Thus, in this example embodiment, for each selected symbol display area, the play of the game results in a winning outcome for that symbol display area if the shape of the symbol displayed at that symbol display area corresponds to the shape of that symbol display area. It should be appreciated that, in this example embodiment, there are as many independent outcomes for the play of the game as there are selected symbol display areas.

Table 1 above lists, for each symbol display area in this example embodiment, information associated with that symbol display area including: (a) the shape of that symbol display area; (b) the distribution of symbols on the reel associated with that symbol display area; (c) the award (for a 1 credit wager) associated with the play of the game resulting in a winning outcome for that symbol display area; (d) the average expected payback percentage associated with that symbol display area for the play of the game; and (e) the average number of plays of the game that occur per one play of the game resulting in a winning outcome for that symbol display area.

It should be appreciated from Table 1 that while each of the symbol display areas is associated with the same average expected payback percentage (97% in this example embodiment), each of the symbol display areas is associated with a different volatility. For instance, symbol display area 310*a* (described below), which has the circle shape, has a relatively high volatility such that the play of the game results in a winning outcome for symbol display area 310*a* relatively infrequently (approximately every 25,773.2 plays), but the gaming system provides a relatively large award (25,000 credits) when a play of the game results in a winning outcome for symbol display area 310*a*. Conversely, symbol display area 310*m* (described below), which has the diamond shape, has a relatively low volatility such that the play of the game results in a winning outcome for symbol display area 310*m* relatively frequently (approximately every 2.1 plays), but the gaming system provides a relatively small award (2 credits) when a play of the game results in a winning outcome for symbol display area 310*m*.

As noted above, in this example embodiment, the gaming system enables the player to select one or more of the symbol display areas to employ for the play of the game. That is, the gaming system may receive a selection from the player of one of; a plurality of, but less than all of; or all of the symbol display areas to employ for the play of the game. This enables the player to tailor the overall volatility of the play of the game to the player's preference by enabling the player to select a combination of symbol display areas having a desired combination of volatilities to employ for the play of the game. For example, rather than selecting only symbol display area 310*a* for a play of the game, the player may also select symbol display area 310*m* to reduce the overall volatility of the play of the game.

Table 3 below lists, for each of a plurality of example plays of the game: (a) the shape(s) of the selected symbol display area(s) for that play of the game (e.g., the parallelogram shape and the diamond shape); (b) the total amount wagered for that play of the game (e.g., 2 credits (1 credit for each selected symbol display area)); (c) the maximum possible award for that play of the game (e.g., 5 credits); (d) each possible award for that play of the game (e.g., 0 credits, 2 credits, 3 credits, or 5 credits); (e) the average award for a winning outcome for that play of the game (e.g., 2.9 credits); (f) the overall average expected payback percentage for that play of the game (e.g., 97%); and (g) the average number of plays of the game that occur per one play of the game resulting in a winning outcome for at least one of the selected symbol display areas (e.g., the symbol display area having the parallelogram shape displaying the Parallelogram symbol, the symbol display area having the diamond shape displaying the Diamond symbol, or both) for that play of the game (e.g., 1.5 plays per at least one winning outcome).

TABLE 3

Example Plays of the Game Employing Various Different Combinations of Symbol Display Areas

| Shape(s) of Selected Symbol Display Area(s) for a Play | Total Credits Wagered (1 credit per selected symbol display area) | Max Award (credits) | Possible Awards (credits) | Average Award for a Winning Outcome (credits) | AEP % | Average Number of Plays Per Winning Outcome |
|---|---|---|---|---|---|---|
| Diamond | 1 | 2 | 0, 2 | 2.0 | 97% | 2.1 |
| Parallelogram and Diamond | 2 | 5 | 0, 2, 3, 5 | 2.9 | 97% | 1.5 |

TABLE 3-continued

Example Plays of the Game Employing Various Different Combinations of Symbol Display Areas

| Shape(s) of Selected Symbol Display Area(s) for a Play | Total Credits Wagered (1 credit per selected symbol display area) | Max Award (credits) | Possible Awards (credits) | Average Award for a Winning Outcome (credits) | AEP % | Average Number of Plays Per Winning Outcome |
|---|---|---|---|---|---|---|
| Cross and Diamond | 2 | 7 | 0, 2, 5, 7 | 3.3 | 97% | 1.7 |
| Pentagon and Diamond | 2 | 12 | 0, 2, 10, 12 | 3.7 | 97% | 1.9 |
| Ten-Point Star and Diamond | 2 | 27 | 0, 2, 25, 27 | 3.9 | 97% | 2.0 |
| Parallelogram | 1 | 3 | 0, 3 | 3.0 | 97% | 3.1 |
| Cross and Parallelogram | 2 | 8 | 0, 3, 5, 8 | 4.3 | 97% | 2.2 |
| Pentagon and Parallelogram | 2 | 13 | 0, 3, 10, 13 | 5.0 | 97% | 2.6 |
| Ten-Point Star and Parallelogram | 2 | 28 | 0, 3, 25, 28 | 5.6 | 97% | 2.9 |
| Five-Point Star and Parallelogram | 2 | 53 | 0, 3, 50, 53 | 5.8 | 97% | 3.0 |
| Ten-Point Star, Pentagon, Cross, Parallelogram, and Diamond | 5 | 45 | 0, 2, 3, 5, . . . , 45 | 6.3 | 97% | 1.3 |
| Trapezoid, Octagon, Ten-Point Star, Cross, and Diamond | 5 | 632 | 0, 2, 5, 7, . . . , 632 | 8.2 | 97% | 1.7 |
| Seven-Point Star, Triangle, Five-Point Star, Pentagon, and Parallelogram | 5 | 1,313 | 0; 3; 10; 13; . . . ; 1,313 | 12.1 | 97% | 2.5 |
| Circle, Hexagon, Square, Seven-Point Star, and Trapezoid | 5 | 41,500 | 0; 500; 1,000; . . . ; 41,500 | 1498.2 | 97% | 308.9 |
| Circle, Hexagon, Parallelogram, and Diamond | 4 | 35,005 | 0; 2; 3; 5; . . . ; 35,005 | 5.8 | 97% | 1.5 |
| Trapezoid, Triangle, Octagon, Five-Point Star, and Ten-Point star | 5 | 925 | 0, 25, 50, 100, . . . , 925 | 67.4 | 97% | 13.9 |

It should be appreciated from the examples included in Table 3 that by selecting different combinations of symbol display areas to employ for a play of the game, the player may tailor the frequency of winning outcomes, the volatility, and the variety of available awards for the play of the game to the player's preference.

FIGS. 3A, 3B, 3C, and 3D illustrate screen shots of another example embodiment of the gaming system of the present disclosure providing a play of the game according to process 100*c* described above. In this example embodiment, the gaming system displays (such as on display device 1116 or 1118, described below) a plurality of symbol display areas 310*a*, 310*b*, 310*c*, 310*d*, 310*e*, 310*f*, 310*g*, 310*h*, 310*i*, 310*j*, 310*k*, 310*l*, and 310*m*. Each of the symbol display areas has or is otherwise associated with one of a plurality of different shapes. More specifically, in this example embodiment: (a) symbol display area 310*a* has a circle shape, (b) symbol display area 310*b* has a hexagon shape, (c) symbol display area 310*c* has a square shape, (d) symbol display area 310*d* has a seven-point star shape, (e) symbol display area 310*e* has a trapezoid shape, (f) symbol display area 310*f* has a triangle shape, (g) symbol display area 310*g* has an octagon shape, (h) symbol display area 310*h* has a five-point star shape, (i) symbol display area 310*i* has a ten-point star shape, (j) symbol display area 310*j* has a pentagon shape, (k) symbol display area 310*k* has a cross shape, (l) symbol display area 310*l* has a parallelogram shape, and (m) symbol display area 310*m* has a diamond shape.

The symbol display areas are each associated with separate, independent symbol generators, which are independent reels in this example embodiment, each of which has or is otherwise associated with a plurality of symbols. Each reel is configured to display one of the symbols on that reel at the symbol display area with which that reel is associated. In this example embodiment, each of the reels includes a different combination of the following symbols: a Circle symbol, a Hexagon symbol, a Square symbol, a Seven-Point Star symbol, a Trapezoid symbol, a Triangle symbol, an Octagon symbol, a Five-Point Star symbol, a Ten-Point Star symbol, a Pentagon symbol, a Cross symbol, a Parallelogram symbol, and a Diamond symbol.

In this example embodiment, each symbol has a shape that corresponds to the shape of one of the symbol display areas. In this example embodiment, matching shapes correspond to one another. More specifically, in this example embodiment: (a) the circle shape of the Circle symbol corresponds to the circle shape of symbol display area 310*a*, (b) the hexagon shape of the Hexagon symbol corresponds to the hexagon shape of symbol display area 310*b*, (c) the square shape of the Square symbol corresponds to the square shape of symbol display area 310*c*, (d) the seven-point star shape of the Seven-Point Star symbol corresponds to the seven-point star shape of symbol display area 310*d*, (e) the trapezoid shape of the Trapezoid symbol corresponds to the trapezoid shape of symbol display area 310*e*, (f) the triangle shape of the Triangle symbol corresponds to the triangle shape of symbol display area 310*f*, (g) the octagon shape of the Octagon symbol corresponds to the octagon shape of symbol display area 310*g*, (h) the five-point star shape of the Five-Point Star symbol corresponds to the five-point star shape of symbol display area 310*h*, (i) the ten-point star shape of the Ten-Point Star symbol corresponds to the ten-point star shape of symbol display area 310*i*, (j) the pentagon shape of the Pentagon symbol corresponds to the pentagon shape of symbol display area 310*j*, (k) the cross shape of the Cross symbol corresponds to the cross shape of symbol display area 310*k*, (l) the parallelogram shape of the Parallelogram symbol corresponds to the parallelogram shape of symbol display area 310*l*, and (m) the diamond shape of the Diamond symbol corresponds to the diamond shape of symbol display area 310*m*.

The gaming system displays a separate wager area in association with each of the symbol display areas. For each symbol display area, the wager area associated with that symbol display area displays any wager placed on that symbol display area for a play of the game. It should be appreciated that, in this example embodiment, any symbol display area on which a wager is placed for a play of the game is considered a "selected" symbol display area for that play of the game. In this example embodiment: (a) symbol display area 310*a* is associated with wager area 315*a*, (b) symbol display area 310*b* is associated with wager area 315*b*, (c) symbol display area 310*c* is associated with wager area 315*c*, (d) symbol display area 310*d* is associated with wager area 315*d*, (e) symbol display area 310*e* is associated with wager area 315*e*, (f) symbol display area 310*f* is associated with wager area 315*f*, (g) symbol display area 310*g* is associated with wager area 315*g*, (h) symbol display area 310*h* is associated with wager area 315*h*, (i) symbol display area 310*i* is associated with wager area 315*i*, (j) symbol display area 310*j* is associated with wager area 315*j*, (k) symbol display area 310*k* is associated with wager area 315*k*, (l) symbol display area 310*l* is associated with wager area 315*l*, (m) symbol display area 310*m* is associated with wager area 315*m*.

In this example embodiment, the gaming system enables the player to wager on one or more of the symbol display areas for a play of the game using one or more of betting chips 340*a* (1 credit). 340*b* (5 credits), 340*c* (25 credits), 340*d* (100 credits), and 340*e* (250 credits). More specifically, the gaming system enables the player to select one of the betting chips (such as by touching a touch screen) and then select the wager area associated with the symbol display area on which the player desires to place that betting chip (i.e., on which the player desires to wager the amount of credits associated with that betting chip). In other embodiments, the gaming system enables the player to "drag" the betting chips to the wagering areas.

The gaming system also displays a spin button 350, which enables the player to initiate a spin of the reels when the player has finished placing wagers; a message box 360 that displays messages or indications before, during, or after play of the game; and a plurality of meters including: a total wager meter 370 that displays a total wager placed on the play of the game, a total award meter 380 that displays a total of any awards won during the play of the game, and a credit meter 390 that displays the player's credit balance. While in this illustrated example the gaming system indicates any awards in the form of amounts of credits, it should be appreciated that such indications may alternatively or additionally be made in the form of amounts of currency.

Figure 3A:
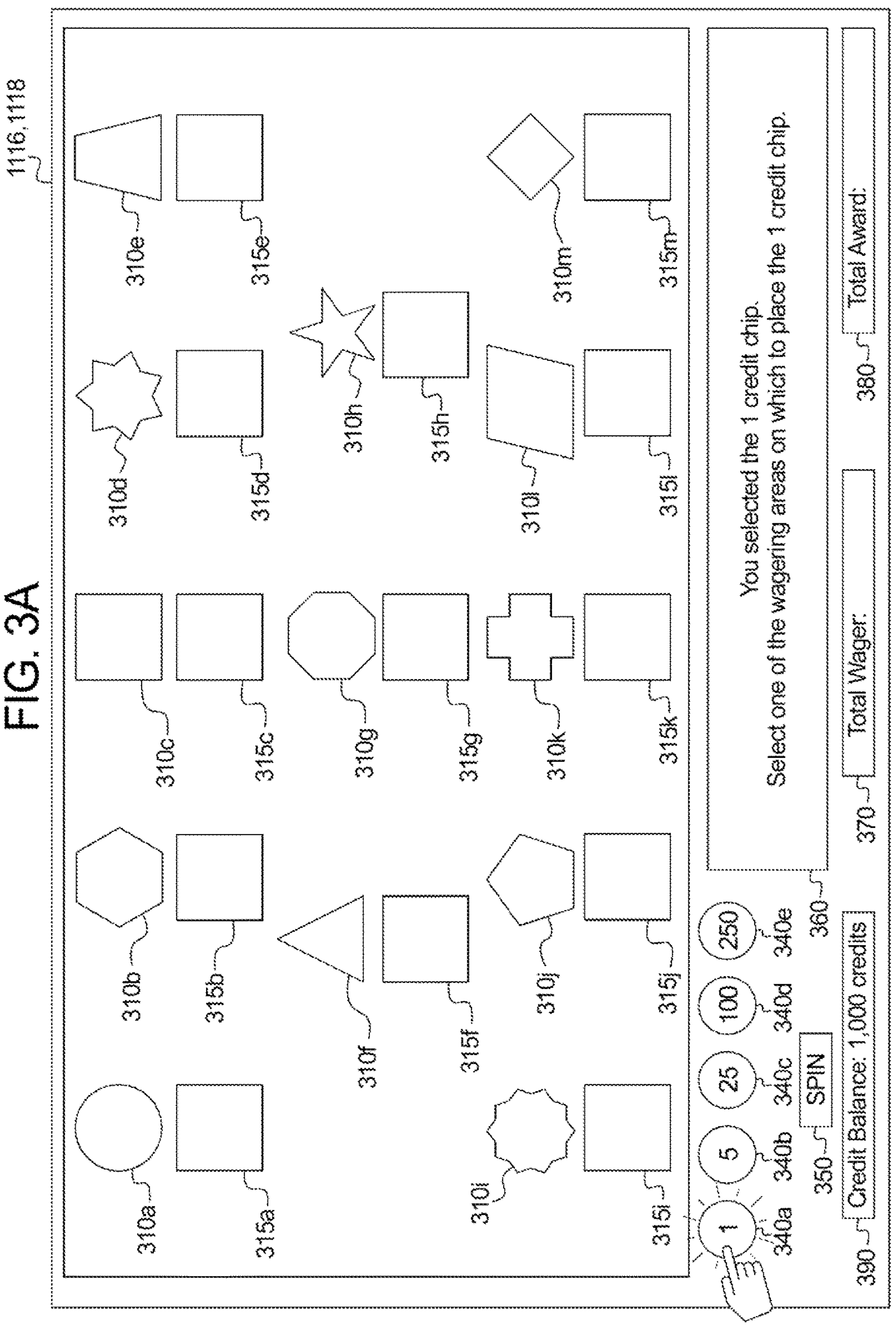
FIGS. 3A, 3B, 3C, and 3D illustrate screen shots of another example embodiment of the gaming system of the present disclosure providing a play of the game according to the method of FIG. 1C.

Turning to FIG. 3A, in this example embodiment; upon receiving a deposit of 1,000 credits from a player, the gaming system enables the player to place wager(s) on one or more of the symbol display areas for a play of the game. The gaming system receives a selection of betting chip 340*a* (1 credit). The gaming system displays the following message in message box 360: "YOU SELECTED THE 1 CREDIT CHIP. SELECT ONE OF THE WAGERING AREAS ON WHICH TO PLACE THE 1 CREDIT CHIP."

Figure 3B:
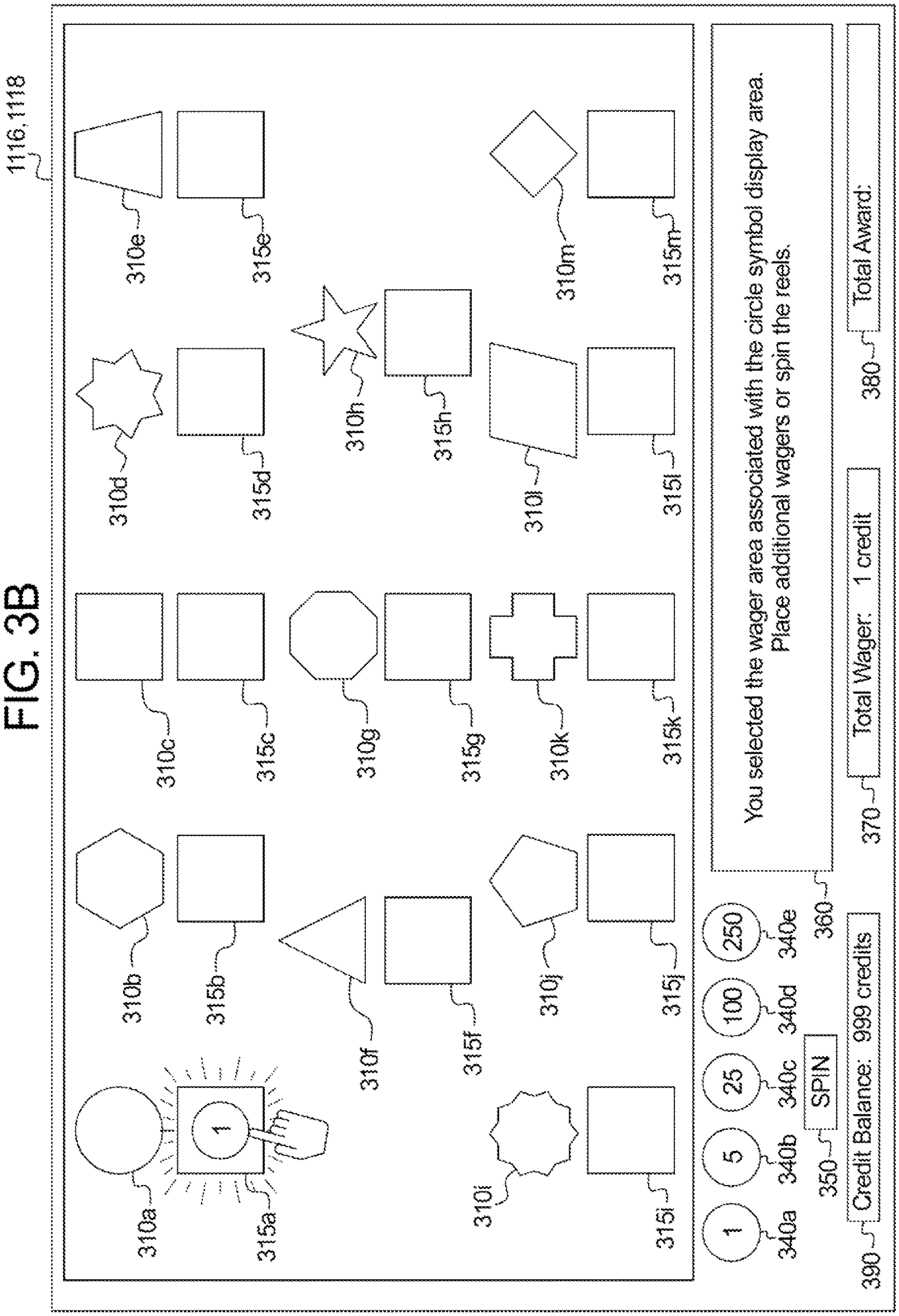

Turning to FIG. 3B, after receiving the selection of betting chip 340*a* (1 credit), the gaming system enables the player to select one of the wagering areas associated with the symbol display area on which the player desires to place betting chip 340*a* (1 credit) (i.e., on which the player desires to place a wager of 1 credit). The gaming system receives a selection of wager area 315*a* associated with symbol display area 310*a*, and displays betting chip 340*a* (1 credit) at wager area 315*a* to indicate a 1 credit wager on symbol display area 310*a*. The gaming system then enables the player to place another wager or to actuate spin button 350 to initiate a spin of the reels. The gaming system displays the following message in message box 360: "YOU SELECTED THE WAGER AREA ASSOCIATED WITH THE CIRCLE SYMBOL DISPLAY AREA. PLACE ADDITIONAL WAGERS OR SPIN THE REELS."

Figure 3C:
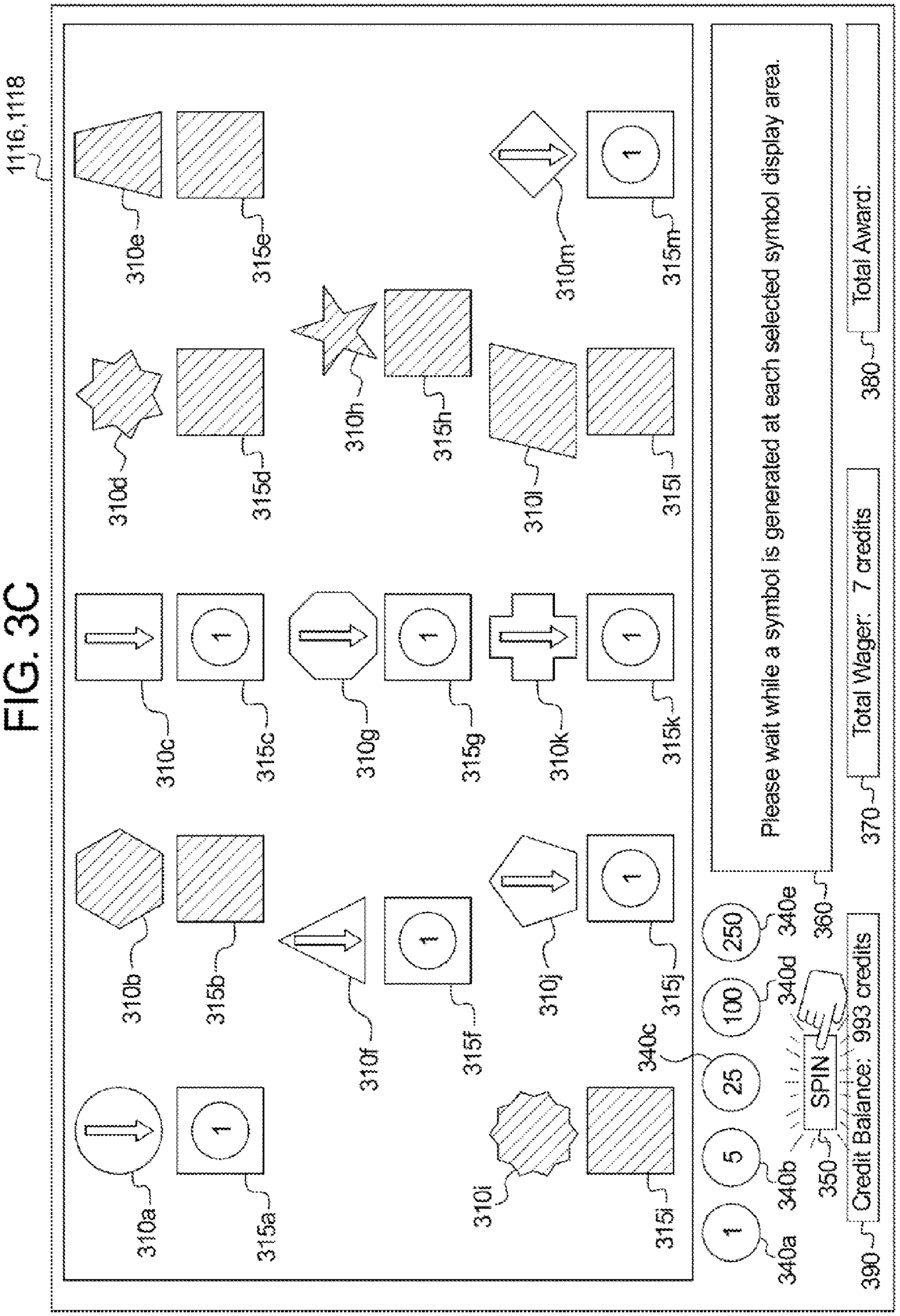

Turning to FIG. 3C, the gaming system displays betting chip 340*a* (1 credit) at wager areas 315*c*, 315*f*, 315*g*, 315*j*, 315*k*, and 315*m*, indicating that the gaming system has received a wager of 1 credit from the player on symbol display areas 310*c*, 310*f*, 310*g*, 310*j*, 310*k*, and 310*m* in addition to the 1 credit wager on symbol display area 310*a*, resulting in a total wager of 7 credits (as indicated by total wager meter 370). The gaming system receives an actuation of spin button 350, and initiates a spin of the reels associated with selected symbol display areas 310*a*. 310*c*, 310*f*, 310*g*, 310*j*, 310*k*, and 310*m*. The gaming system displays the following message in message box 360: "PLEASE WAIT WHILE A SYMBOL IS GENERATED AT EACH SELECTED SYMBOL DISPLAY AREA."

Figure 3D:
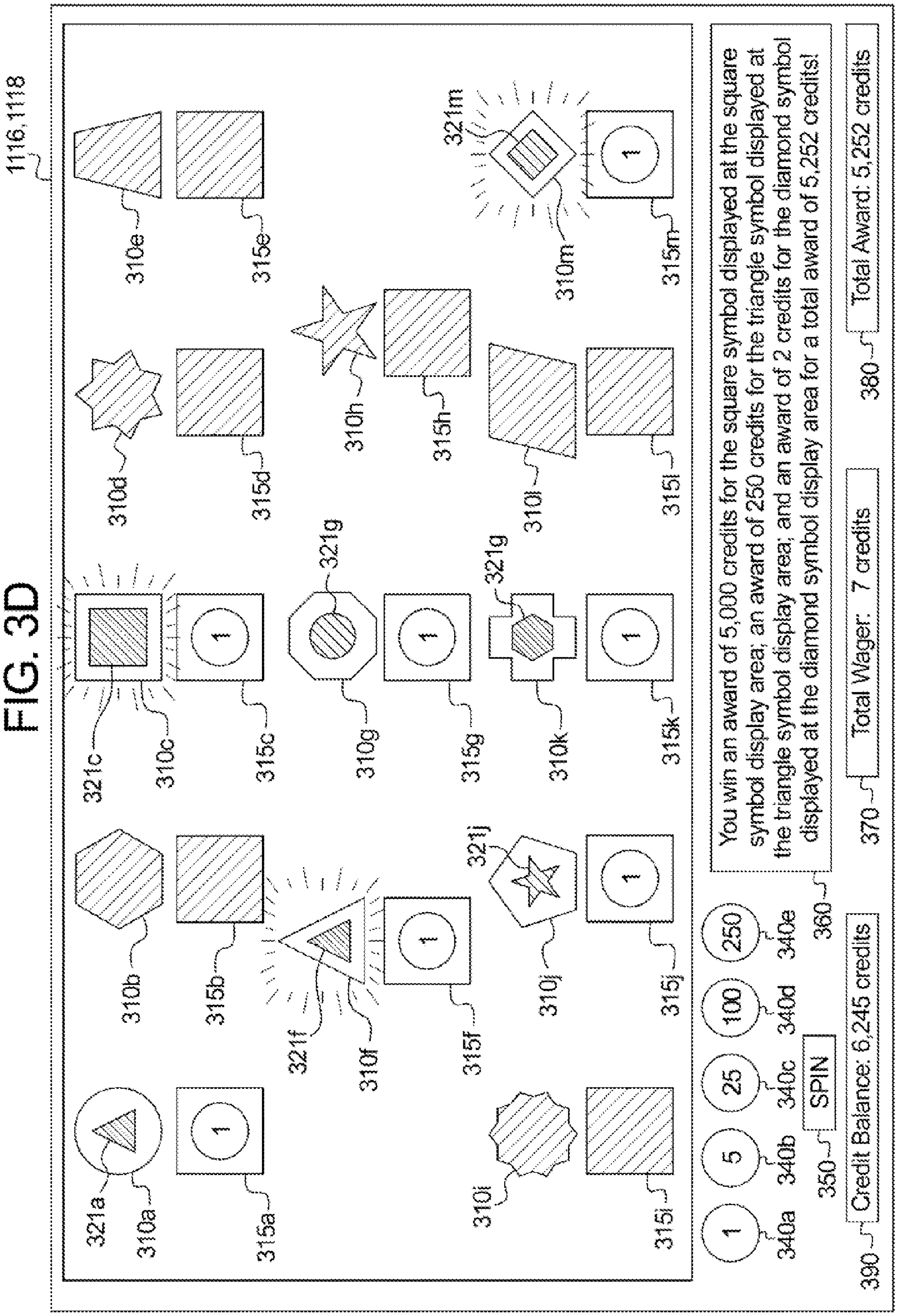

Turning to FIG. 3D, the gaming system: (a) generates and displays the Triangle symbol 321*a* at symbol display area 310*a*, (b) generates and displays the Square symbol 321*c* at symbol display area 310*c*, (c) generates and displays the Triangle symbol 321*f* at symbol display area 310*f*, (d) generates and displays the Circle symbol 321*g* at symbol display area 310*g*, (e) generates and displays the Five-Point Star symbol 321*j* at symbol display area 310*j*, (f) generates and displays the Hexagon symbol 321*k* at symbol display area 310*k*, and (g) generates and displays the Diamond symbol 321*m* at symbol display area 310*m*.

For each of the symbol display areas, the gaming system makes a separate, independent award determination to determine whether the play of the game results in a winning outcome for that symbol display area. More specifically, for each of the symbol display areas, the gaming system determines whether the shape of the symbol displayed at that symbol display area corresponds to the shape of that symbol display area. If so, the gaming system determines that the play of the game results in a winning outcome for that symbol display area, and determines an award associated with that symbol display area based on a suitable paytable, such as the paytable included in Table 4 below.

TABLE 4

Example Paytable

| Shape Associated with Symbol Display Area | Award for Winning Outcome (for 1 credit wager) |
|---|---|
| Circle | 25,000 credits |
| Hexagon | 10,000 credits |
| Square | 5,000 credits |
| Seven-Point Star | 1,000 credits |
| Trapezoid | 500 credits |
| Triangle | 250 credits |
| Octagon | 100 credits |
| Five-Point Star | 50 credits |
| Ten-Point Star | 25 credits |
| Pentagon | 10 credits |
| Cross | 5 credits |
| Parallelogram | 3 credits |
| Diamond | 2 credits |

In this example embodiment, the gaming system determines: (a) that the triangle shape of the Triangle symbol 321*a* does not correspond to the circle shape of symbol display area 310*a* at which the Triangle symbol 321*a* is displayed; (b) that the square shape of the Square symbol 321*c* corresponds to the square shape of symbol display area 310*c* at which the Square symbol 321*c* is displayed; (c) that the triangle shape of the Triangle symbol 321*f* corresponds to the triangle shape of symbol display area 310*f* at which the Triangle symbol 321*f* is displayed; (d) that the circle shape of the Circle symbol 321*g* does not correspond to the octagon shape of symbol display area 310*g* at which the Circle symbol 321*g* is displayed; (e) that the five-point star shape of the Five-Point Star symbol 321*j* does not correspond to the pentagon shape of symbol display area 310*j* at which the Five-Point Star symbol 321*j* is displayed; (f) that the hexagon shape of the Hexagon symbol 321*k* does not correspond to the cross shape of symbol display area 310*k* at which the Hexagon symbol 321*k* is displayed; and (g) that the diamond shape of the Diamond symbol 321*m* corresponds to the diamond shape of symbol display area 310*m* at which the Diamond symbol 321*m* is displayed.

Accordingly, the gaming system determines: (a) an award of 5,000 credits associated with the play of the game resulting in a winning outcome for symbol display area 310*c*; (b) an award of 250 credits associated with the play of the game resulting in a winning outcome for symbol display area 310*f*; and (c) an award of 2 credits associated with the play of the game resulting in a winning outcome for symbol display area 310*m* for a total award of 5,252 credits. The gaming system updates total award meter 380 and the player's credit balance displayed in credit meter 390 to reflect the 5,252 credit total award. In certain embodiments, the gaming system displays the player's total award and/or the awards associated with the separate winning outcome using betting chips. The gaming system displays the following message in message box 360: "YOU WIN AN AWARD OF 5,000 CREDITS FOR THE SQUARE SYMBOL DISPLAYED AT THE SQUARE SYMBOL DISPLAY AREA; AN AWARD OF 250 CREDITS FOR THE TRIANGLE SYMBOL DISPLAYED AT THE TRIANGLE SYMBOL DISPLAY AREA; AND AN AWARD OF 2 CREDITS FOR THE DIAMOND SYMBOL DISPLAYED AT THE DIAMOND SYMBOL DISPLAY AREA FOR A TOTAL AWARD OF 5,252 CREDITS!"

It should be appreciated that any suitable quantity of betting chips may be employed, and that the betting chips may be associated with any suitable numbers of credits. In one embodiment, the betting chips are customizable by the player or the gaming establishment. In another embodiment, the betting chips are changeable in terms of currency.

Multiplayer Format

It should be appreciated that the embodiments described herein may be implemented in a multiplayer format. Generally, in one example multiplayer embodiment, the gaming system enables a group of players to each place wager(s) on one or more of the symbol display areas. Once the players have finished wagering, the gaming system generates and displays an outcome for each of the symbol display areas. For each player, the gaming system determines and provides any awards associated with the wager(s) placed by that individual player.

Figure 4:
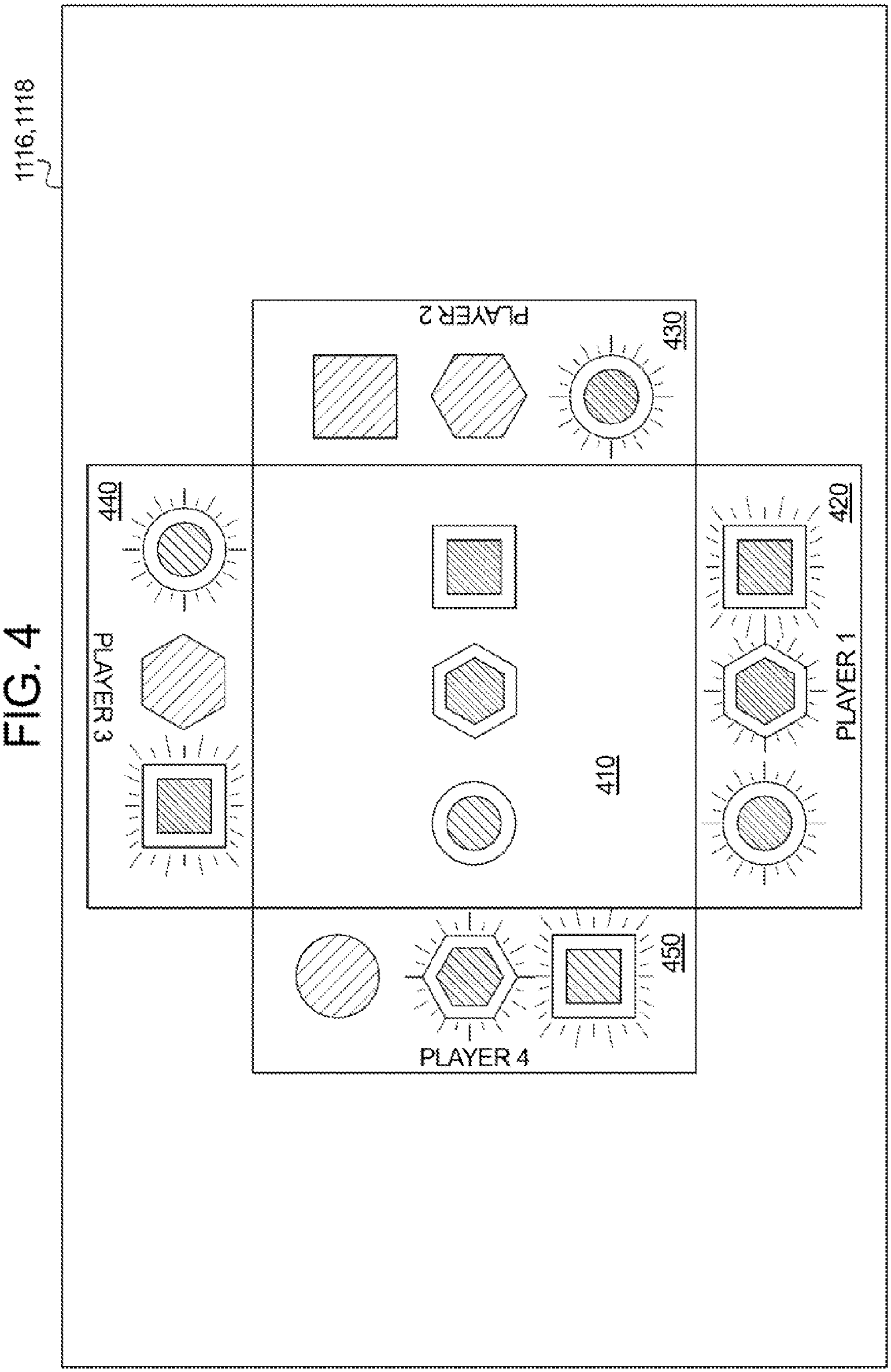
FIG. 4 illustrates a screen shot of an example multiplayer embodiment of the gaming system of the present disclosure providing a play of the game.

FIG. 4 illustrates a screen shot of one such example multiplayer embodiment of the gaming system of the present disclosure. In this example embodiment, the gaming system includes a shared or community display device 410 surrounded by a plurality of player gaming stations 420, 430, 440, and 450. In this example embodiment, the shared display device 510 and the player gaming stations 420, 430, 440, and 450 each display the same plurality of symbol display areas. Each player gaming station 420, 430, 440, and 450 enables the player of that player gaming station to place wagers on one or more of the symbol display areas. The gaming system generates an outcome for each of the symbol display areas, and displays the generated outcomes on the shared display device and the player gaming stations 420, 430, 440, and 450. Each player gaming station then provides any awards associated with the wager(s) placed by the player of that player gaming station. In one embodiment, the shared display device indicates the awards (if any) for all of the players.

Additional Embodiments

Figure 5:
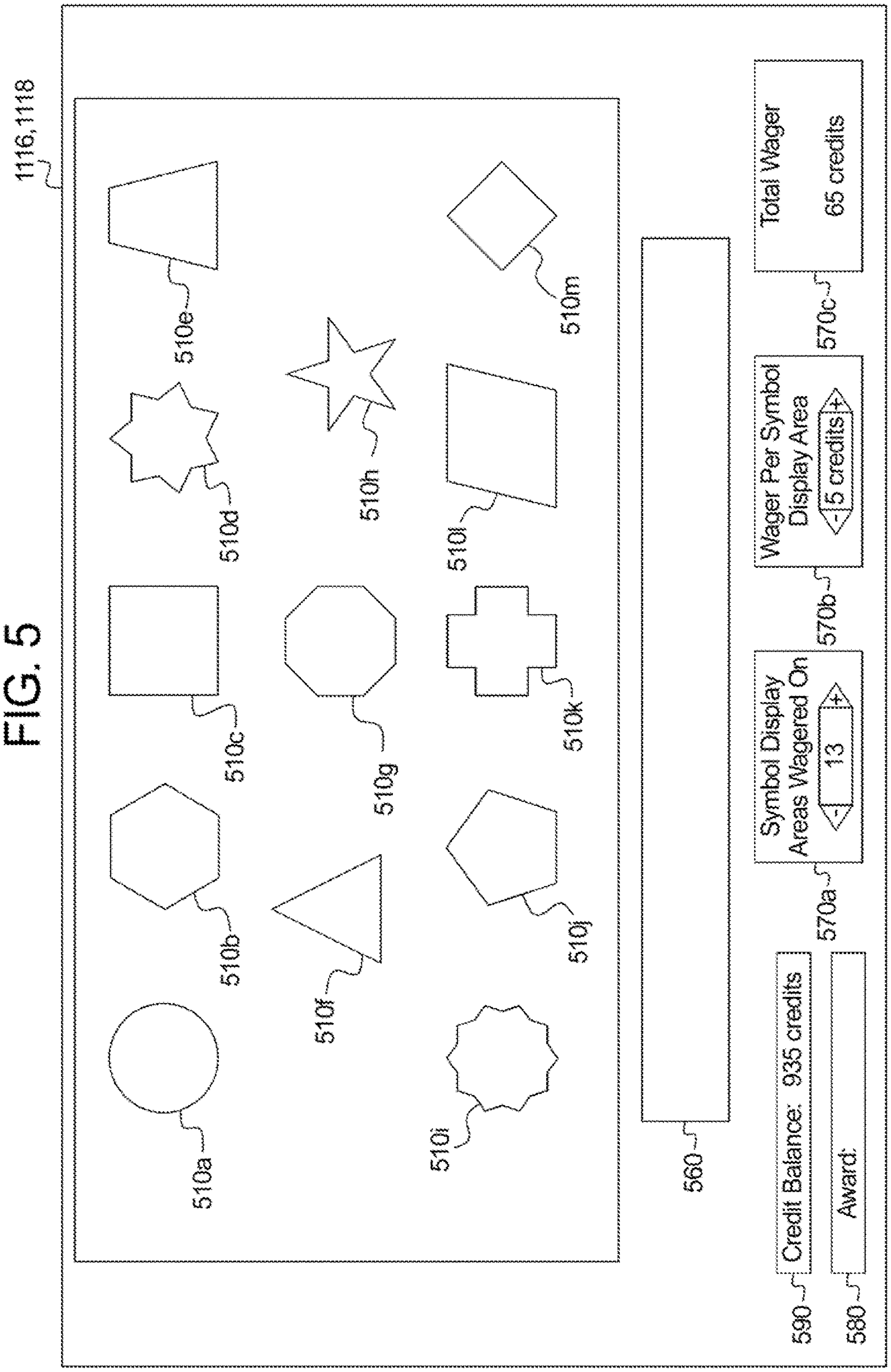
FIG. 5 illustrates a screen shot of another example embodiment of the gaming system of the present disclosure providing a play of the game and employing an alternative wagering mechanism.

FIG. 5 illustrates a screen shot of another example embodiment of the gaming system of the present disclosure. In this example embodiment, the gaming system enables the player to select: (a) a quantity of symbol display areas on which the player desires to place a wager (such as by using toggle 470*a*), and (*b*) a wager amount (such as by using toggle 470*b*). In this example embodiment, the gaming system randomly determines a number of the symbol display areas equal to the quantity selected by the player, and places a wager of the selected wager amount on each of the randomly determined symbol display areas. It should thus be appreciated that, in this example embodiment, the gaming system enables the player to specify how many symbol display areas on which to place a wager and an amount of the wager placed on each symbol display area, but does not enable the player to select which specific symbol display areas on which the wager is placed and does not enable the player to place wagers of different amounts on different symbol display areas.

In various embodiments, the gaming system simultaneously displays the generated symbols at the symbol display areas. In other embodiments, the gaming system sequentially displays the generated symbols at the symbol display areas, such as sequentially from left to right, right to left, top to bottom, bottom to top, and the like. In other embodiments, the gaming system sequentially displays the generated symbols at the symbol display areas from the symbol display area associated with the highest award to the symbol display area associated with the lowest award, or vice-versa. In another embodiment, the gaming system sequentially displays the generated symbols at the symbol display areas by alternating the symbol display areas with the highest payouts and the symbol display areas with the lowest payouts (e.g., displays the generated symbol at the symbol display area associated with the highest payout, then displays the generated symbol at the symbol display area associated with the lowest payout, then displays the generated symbol at the symbol display area associated with the next-highest payout, and so on).

In certain embodiments, each reel spins at the same speed. In other embodiments, at least one reel spins at a different speed than at least one other reel. In further embodiments, each reel slows to a stop (to display the generated symbol on that reel at the associated symbol display area) at the same rate. In other embodiments, at least one reels slows to a stop at a different rate than at least one other reel.

In various embodiments, for each of the symbol display areas, although the gaming system (in certain embodiments) displays the potential award associated with a winning outcome occurring for that symbol display area for a play of the game, the gaming system does not display the probability of that winning outcome occurring for that symbol display area for the play of the game. In other embodiments, however, for at least one of the symbol display areas, the gaming system displays the probability of a winning outcome occurring for that symbol display area for a play of the game.

It should be appreciated that, for each reel, the weighting of the symbols on that reel may be varied, with no apparent visual difference to the player, to change the probability of a winning outcome occurring for the symbol display area associated with that reel for a play of the game. For example, Table 5 below lists the information included in Table 1 above, but modified such that the average expected payback percentage associated with each symbol display area for a play of the game is 93%. It should be appreciated that the weightings of the symbols on the reels may be modified such that any suitable average expected payback percentage is achieved, and that different reels may have different average expected payback percentages.

TABLE 5

Symbol Display Area Information for 93% Average Expected Payback Percentage

| Shape Associated with Symbol Display Area | Symbol Distribution of Associated Reel | Award for Winning Outcome (1 credit wager) | AEP % | Average Number of Plays Per Winning Outcome |
|---|---|---|---|---|
| Circle | Circle-37<br>All others-999,93 | 25,000 credits | 93% | 26,881.7 |
| Hexagon | Hexagon-93<br>All others-999,903 | 10,000 credits | 93% | 10,752.7 |
| Square | Square-186<br>All others-999,814 | 5,000 credits | 93% | 5,376.3 |
| Seven-Point Star | Seven-Point Star-930<br>All others-999,030 | 1,000 credits | 93% | 1,075.3 |
| Trapezoid | Trapezoid-1,860<br>All others-998,140 | 500 credits | 93% | 537.6 |
| Triangle | Triangle-3,720<br>All others-996,280 | 250 credits | 93% | 268.8 |
| Octagon | Octagon-9,300<br>All others-990,700 | 100 credits | 93% | 107.5 |
| Five-Point Star | Five-Point Star-18,600<br>All others-981,400 | 50 credits | 93% | 53.8 |
| Ten-Point Star | Ten-Point Star-37,200<br>All others-962,800 | 25 credits | 93% | 26.9 |
| Pentagon | Pentagon-93,000<br>All others-907,000 | 10 credits | 93% | 10.8 |
| Cross | Cross-186,000<br>All others-814,000 | 5 credits | 93% | 5.4 |
| Parallelogram | Parallelogram-310,000<br>All others-690,000 | 3 credits | 93% | 3.2 |
| Diamond | Diamond-465,000<br>All others-535,000 | 2 credits | 93% | 2.2 |

In certain embodiments, the gaming system may vary the average expected payback percentage associated with a given symbol display area (i.e., may vary the average expected payback percentage of the reel associated with that symbol display area). In one example embodiment, the gaming system increases the average expected payback percentage associated with a designated symbol display area (such as by increasing the number of symbols on the reel associated with that symbol display area that, if generated, would result in a winning outcome for that symbol display area) if the player selects to employ only that symbol display area for a play of the game. In another example embodiment, the gaming system increases the average expected payback percentage associated with at least one selected symbol display area if at least a designated quantity of the symbol display areas were selected for a play of the game. In another example embodiment, the gaming system increases the average expected payback percentage associated with at least one selected symbol display area if a total wager on a play of the game is at least a designated amount. In another example embodiment, the gaming system increases the average expected payback percentage associated with at least one selected symbol display area if a designated combination of the symbol display areas are selected for a play of the game. In another example embodiment, the gaming system increases the average expected payback percentage associated with at least one selected symbol display area if a wager placed on that symbol display area is at least a designated amount.

In various embodiments (such as the example embodiment described above with respect to FIGS. 3A to 3D), the gaming system enables the player to place wagers of different amounts on different symbol display areas. For instance, the gaming system enables the player to place a wager of 10 credits on the symbol display area associated with the highest hit frequency and the lowest award and a wager of 1 credit on the symbol display area associated with the lowest hit frequency and the highest award.

In certain embodiments, one or more of the reels each include one or more bonus symbols that, if generated and displayed for a play of the game, cause the gaming system to provide a bonus award (such as an award of credits) or to trigger a play of a bonus game (such as a free spins game). In one embodiment, the weighting of bonus symbols is the same across all reels including bonus symbols (e.g., each reel includes ten bonus trigger symbols). In another embodiment, the weighting of bonus symbols differs across the reels. For instance, in one example embodiment, the reel associated with the symbol display area that is historically the least wagered-on symbol display area includes more bonus symbols than each of the other reels to encourage players to wager on that symbol display area. In another example embodiment, the symbol display area that has the lowest average number of plays per winning outcome (i.e., the lowest odds of achieving a winning outcome) has more bonus symbols than each of the other reels to provide players (another) potential benefit to wagering on that symbol display area.

In another example embodiment, the gaming system provides a bonus award or triggers a play of a bonus game when a designated quantity of bonus symbols are generated and displayed for a play of the game. In another example embodiment, the value of the bonus award or the triggered play of the bonus game increases as the number of bonus symbols generated and displayed for a play of the game increases. Both of these embodiments encourage players to wager on most or all of the symbol display areas associated with reels including at least one bonus symbol.

In various embodiments, instead of or in addition to making separate, independent award determinations associated with each symbol display area, the gaming system determines one or more awards for designated combinations of symbols having shapes that correspond to the shapes of the symbol display areas at which they are displayed. In one example embodiment, the gaming system determines and provides an award if one of one or more designated combinations of symbols (having shapes that correspond to the shapes of the symbol display areas at which they are displayed) is displayed. In another example embodiment, the gaming system determines and provides an award if a total number of symbols (having shapes that correspond to the shapes of the symbol display areas at which those symbols are displayed) is at least a designated number. It should be appreciated that bonus awards or bonus games may be provided and triggered based on such combinations.

In certain embodiments, the gaming system evaluates the displayed symbols for such combinations in a directional manner, such as from left to right or right to left. Table 6 below illustrates an example paytable for one such embodiment.

TABLE 6

Example Paytable

| Combination (from left to right) | Award (for 1 credit wager) | Average Number of Plays Per Winning Outcome |
|---|---|---|
| Pentagon→Ten-Point Star→Five-Point Star→Octagon→Triangle→Trapezoid→Seven-Point Star→Square→Hexagon→Circle | 100,000,000 credits | 10,000,000,000 |
| Pentagon→Ten-Point Star→Five-Point Star→Octagon→Triangle→Trapezoid→Seven-Point Star→Square→Hexagon | 50,000,000 credits | 1,111,111,111 |
| Pentagon→Ten-Point Star→Five-Point Star→Octagon→Triangle→Trapezoid→Seven-Point Star→Square | 10,000,000 credits | 111,111,111 |
| Pentagon→Ten-Point Star→Five-Point Star→Octagon→Triangle→Trapezoid→Seven-Point Star | 1,000,000 credits | 11,111,111 |
| Pentagon→Ten-Point Star→Five-Point Star→Octagon→Triangle→Trapezoid | 125,000 credits | 1,111,111 |
| Pentagon→Ten-Point Star→Five-Point Star→Oatagon→Triangle | 15,000 credits | 111,111 |
| Pentagon→Ten-Point Star→Five-Point Star-Octagon | 1,200 credits | 11,111 |
| Pentagon→Ten-Point Star→Five-Point Star | 100 credits | 1,111 |
| Pentagon→Ten-Point Star | 10 credits | 111 |
| Pentagon | 2 credits | 11 |

In other embodiments, the gaming system evaluates the displayed symbols for such combinations independent of the order in which such symbols are displayed. Table 7 below illustrates an example paytable for one such embodiment.

TABLE 7

| Example Paytable | | |
|---|---|---|
| Combination | Award (for 1 credit wager) | Average Number of Plays Per Winning Outcome |
| Pentagon, Ten-Point Star, Five-Point Star, Octagon, Triangle, Trapezoid, Sevan-Point Star, Square, Hexagon, Circle | 10,000 credits | 10,000,00,000 |
| Pentagon, Ten-Point Star, Five-Point Star, Octagon, Triangle, Trapezoid, Seven-Point Star, Square, Hexagon | 10,000 credits | 111,111,111 |
| Pentagon, Ten-Point Star, Five-Point Star, Octagon, Triangle, Trapezoid, Seven-Point Star, Square | 10,000 credits | 2,743,484 |
| Pentagon, Ten-Point Star, Five-Point Star, Octagon, Triangle, Trapezoid, Seven-Point Star | 1,000 credits | 114,312 |
| Pentagon, Ten-Point Star, Five-Point Star, Octagon, Triangle, Trapezoid | 100 credits | 7,258 |
| Pentagon, Ten-Point Star, Five-Point Star, Octagon, Triangle | 50 credits | 672 |
| Pentagon, Ten-Point Star, Five-Point Star, Octagon | 10 credits | 90 |
| Pentagon, Ten-Point Star, Five-Point Star | 3 credits | 17 |
| Pentagon, Ten-Point Star | 2 credits | 5 |
| Pentagon | 0.5 credits | 3 |

In certain embodiments, the gaming system provides an award if each symbol display area of a group of two or more designated symbol display areas displays a symbol having a shape corresponding to the shape of that symbol display area. For instance, in one example embodiment, the game has a theme similar to that of the Operation® board game. In this example embodiment, the gaming system displays a "patient" and displays the symbol display areas on or otherwise in association with various areas of the patient, such as the patient's legs, arms, torso, and head. Each symbol display area is associated with the area of the patient at which that symbol display area is displayed. For instance, one of the symbol display areas displayed on the patient's torso has a heart shape. In this example embodiment, the gaming system provides an award if: (a) each of the symbol display areas on the arms of the patient display symbols having shapes corresponding to the shapes of their respective symbol display areas, (b) each of the symbol display areas on the legs of the patient display symbols having shapes corresponding to the shapes of their respective symbol display areas, (c) each of the symbol display areas on the torso of the patient display symbols having shapes corresponding to the shapes of their respective symbol display areas, (d) each of the symbol display areas on the arms and the legs of the patient display symbols having shapes corresponding to the shapes of their respective symbol display areas, and/or (e) each of the symbol display areas on the arms and the torso of the patient display symbols having shapes corresponding to the shapes of their respective symbol display areas, and each of the symbol display areas on the legs and the torso of the patient display symbols having shapes corresponding to the shapes of their respective symbol display areas.

In various embodiments, each of the symbols on the reels has one of a plurality of different colors. Symbols of the same shape may have different colors (e.g., the reels may include both a red Circle symbol, a white Circle symbol, and a blue Circle symbol). In these embodiments, the gaming system determines an award based on the colors of the symbols displayed at the symbol display areas. In one embodiment, this award determination based on the color of the displayed symbols is independent of any other award determinations (such as award determinations based on whether the shape of the symbol displayed at a symbol display area corresponds to the shape of that symbol display area). In another embodiment, the gaming system determines any awards based on combinations, counts, or patters of colors. In another embodiment, the gaming system determines any awards based only on the color of: (a) the displayed symbols having shapes that correspond to the shapes of the respective symbol display areas at which they are displayed, or (b) the displayed symbols having shapes that do not correspond to the shapes of the respective symbol display areas at which they are displayed.

In certain embodiments, one or more jackpot symbols are included on one or more of the reels. In these embodiments, when one of the jackpot symbols displayed at one of the symbol display areas, the gaming system provides a jackpot award associated with that displayed jackpot symbol to the player. In one such embodiment, the reels each include different jackpot symbols. Thus, in this embodiment, the player is eligible for a different jackpot award for each symbol display area the player selects to employ for the play of the game. This also enables the player to pick and choose which jackpot awards to play for by selecting their corresponding symbol display areas to employ for the play of the game. It should be appreciated that the jackpot symbols may be weighted on the reels in any suitable manner. For instance, one reel may include a quantity of jackpot symbols such that the jackpot symbol is generated and displayed at the symbol display area associated with that reel once every 1,000 plays, on average, and another reel may include a quantity of jackpot symbols such that the jackpot symbol is generated and displayed at the symbol display area associated with that reel once every 200 plays, on average. In one embodiment, the jackpots are funded in part by wagers placed on the symbol display areas associated with the reels including the jackpot symbols.

In the above-described example embodiments, the symbols on the reels have shapes that correspond to one of the shapes of one of the symbol generators. That is, in the above-described example embodiments, none of the reels include a symbol having a shape that does not correspond to one of the shapes of one of the symbol display areas. In other embodiments, however, at least one of the reels includes a symbol having a shape that is not associated with a shape of any of the symbol display areas.

In certain embodiments, at least one of the reels includes a Wild symbol. In one embodiment, the Wild symbol corresponds to the shapes of all of the symbol display areas. In another such embodiment, the Wild symbol corresponds to the shapes of a subset of, but not all of, the symbol display areas.

In another embodiment, the shape of a symbol corresponds to the shape of the symbol display area at which that symbol is displayed if the shapes share certain characteristics. For instance, in one example embodiment, shapes having a same quantity of sides correspond to one another, such that the square shape, the rectangle shape, the parallelogram shape, the trapezoid shape, and the diamond shape correspond to one another. In another embodiment, the shape of a symbol corresponds to the shape of the symbol display area at which that symbol is displayed if the shapes are the same overall shape. For instance, in one example embodiment, the five-point star symbol, the seven-point star symbol, and the ten-point star symbol correspond to one another because they share the same overall shape.

Figure 6A:
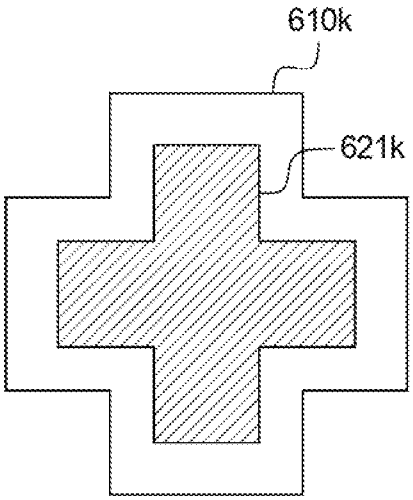
FIGS. 6A, 6B, and 6C each illustrate a symbol display area displaying a symbol in an embodiment of the gaming system of the present disclosure in which the shape of a symbol corresponds to the shape of the symbol display area at which that symbol is displayed if the shape of that symbol matches at least a portion of the shape of that symbol display area.
Figure 6B:
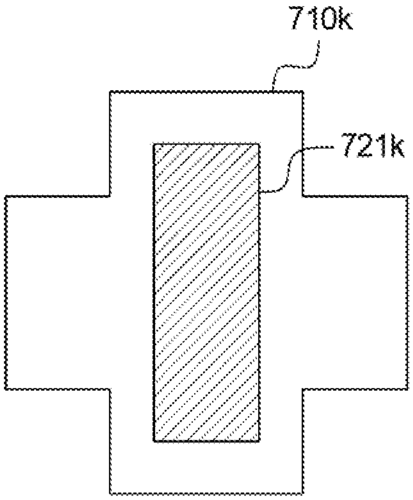
Figure 6C:
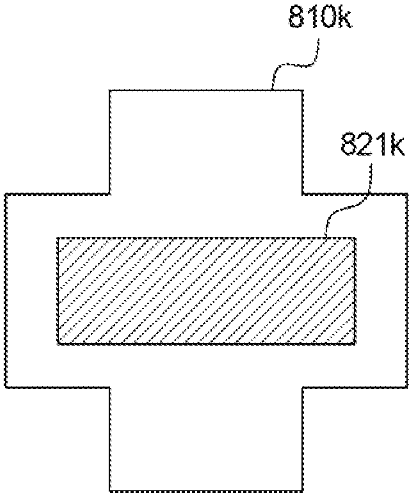

In another embodiment, the shape of a symbol corresponds to the shape of the symbol display area at which that symbol is displayed if the shape of that symbol matches at least a portion of the shape of that symbol display area. FIG. 6A illustrates a symbol display area 610*k* having the cross shape and displaying Cross symbol 621*k*. The cross shape of Cross symbol 621*k* matches the cross shape of symbol display area 610*k* and, therefore, the cross shape of Cross symbol 621*k* corresponds to the cross shape of symbol display area 610*k* in this example embodiment. FIG. 6B illustrates a symbol display area 710*k* having the cross shape and displaying Vertical Rectangle symbol 721*k*. The vertical rectangle shape of Vertical Rectangle symbol 721*k* matches a portion of the cross shape of symbol display area 710*k* and, therefore, the vertical rectangle shape of Vertical Rectangle symbol 721*k* corresponds to the cross shape of symbol display area 710*k* in this example embodiment. FIG. 6C illustrates a symbol display area 810*k* having the cross shape and displaying Horizontal Rectangle symbol 821*k*. The horizontal rectangle shape of Horizontal Rectangle symbol 821*k* matches a portion of the cross shape of symbol display area 810*k* and, therefore, the horizontal rectangle shape of Horizontal Rectangle symbol 821*k* corresponds to the cross shape of symbol display area 810*k* in this example embodiment. In certain embodiments, the gaming system determines a relatively smaller award associated with a symbol display area when the shape of the symbol displayed at that symbol display area matches a portion of, but not all of, the shape of that symbol display area compared to the award the gaming system determines when the shape of the symbol displayed at that symbol display area matches the entire shape of that symbol display area.

It should further be appreciated that:

(a) the number of symbol display areas;

(b) the shapes;

(c) the shapes associated with the symbol display areas;

(d) the symbols;

(e) the shapes of the symbols;

(f) the symbols on each reel;

(g) the weightings of the symbols on the reels;

(h) the volatility of each reel;

(i) the average expected payback percentage of each reel;

(j) the award associated with each symbol display area;

(k) the maximum number of symbol display areas that may be selected for a play of the game;

(l) the maximum wager on each symbol display area;

(m) the number of betting chips;

(n) the number of credits associated with each betting chip;

(o) how shapes of symbols correspond to shapes of symbol display areas;

(p) any suitable attributes of the symbols (such as color); and/or (q) any other variables or determinations described herein may be: (1) predetermined; (2) randomly determined; (3) randomly determined based on one or more weighted percentages; (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an electronic gaming machine (EGM) configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day): (19) determined independent of time (such as the time of day); (20) determined based on an amount of coin-in accumulated in one or more pools; (21) determined independent of an amount of coin-in accumulated in one or more pools: (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 7A:
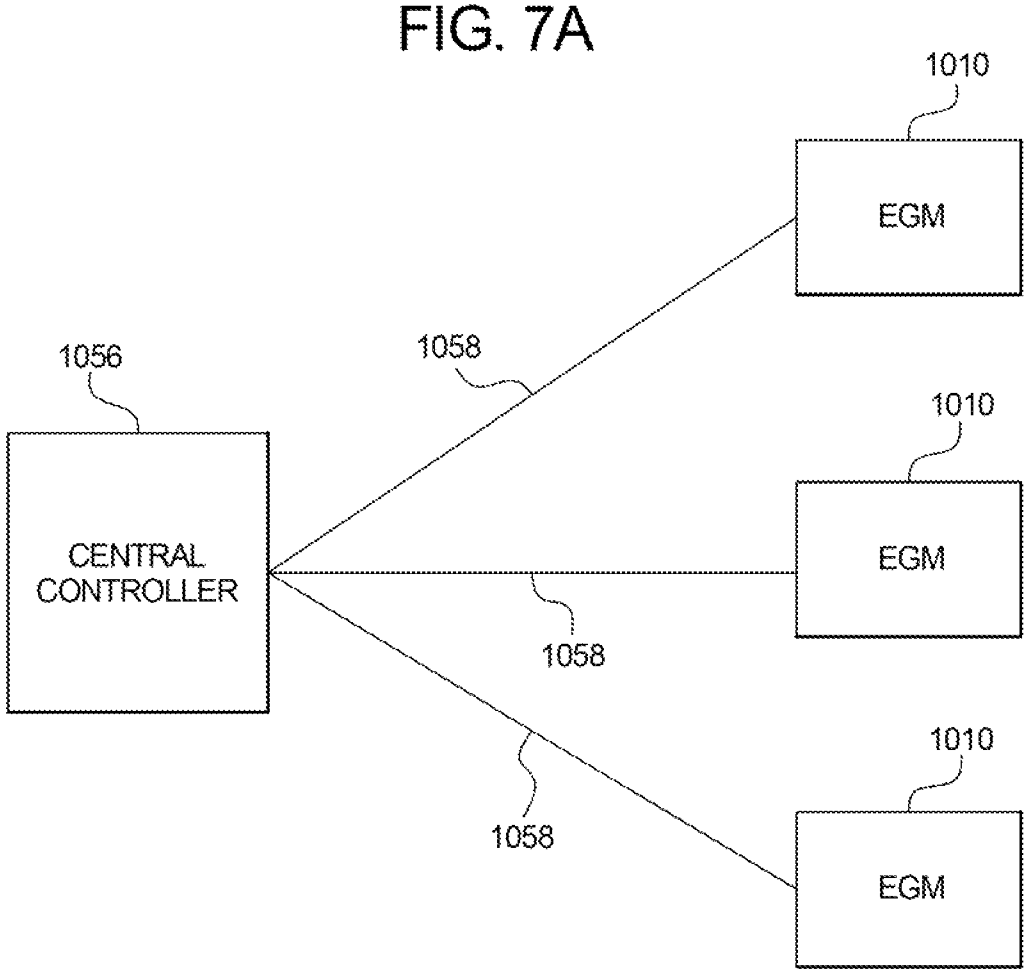
FIG. 7A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 7A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 7B:
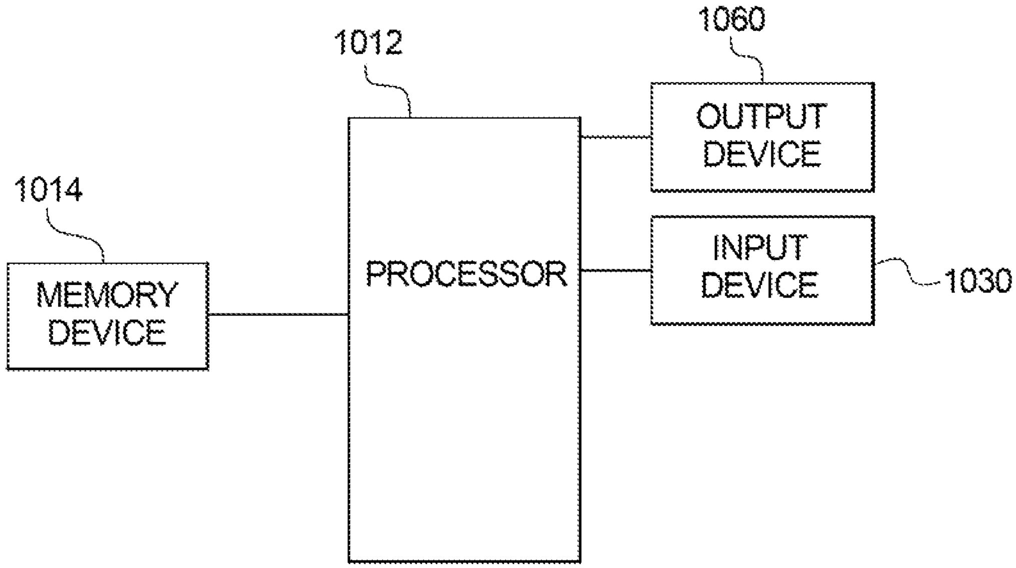
FIG. 7B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 7B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 7B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 8A:
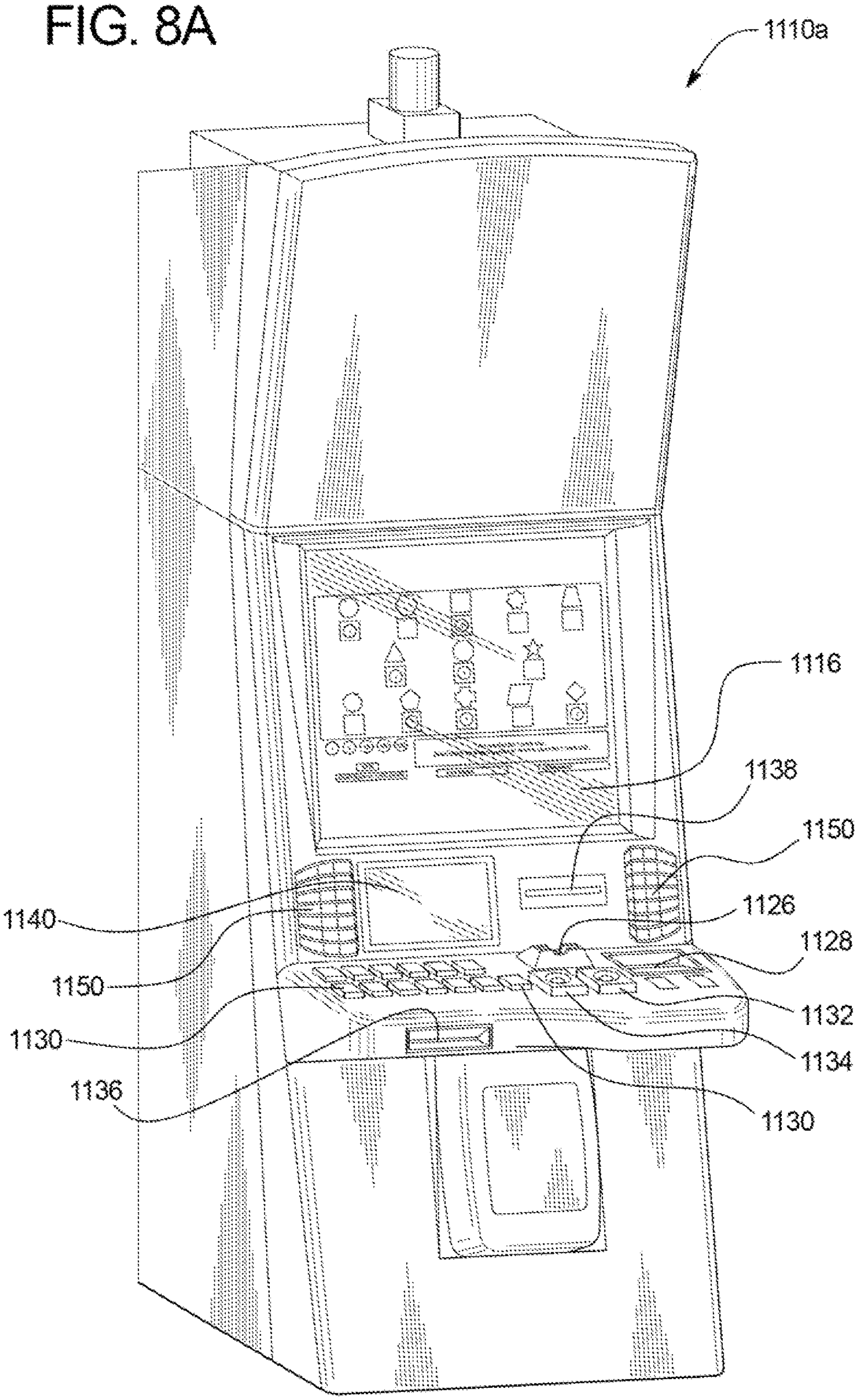
FIGS. 8A and 8B are perspective views of example alternative embodiments of the gaming system of the present disclosure.
Figure 8B:
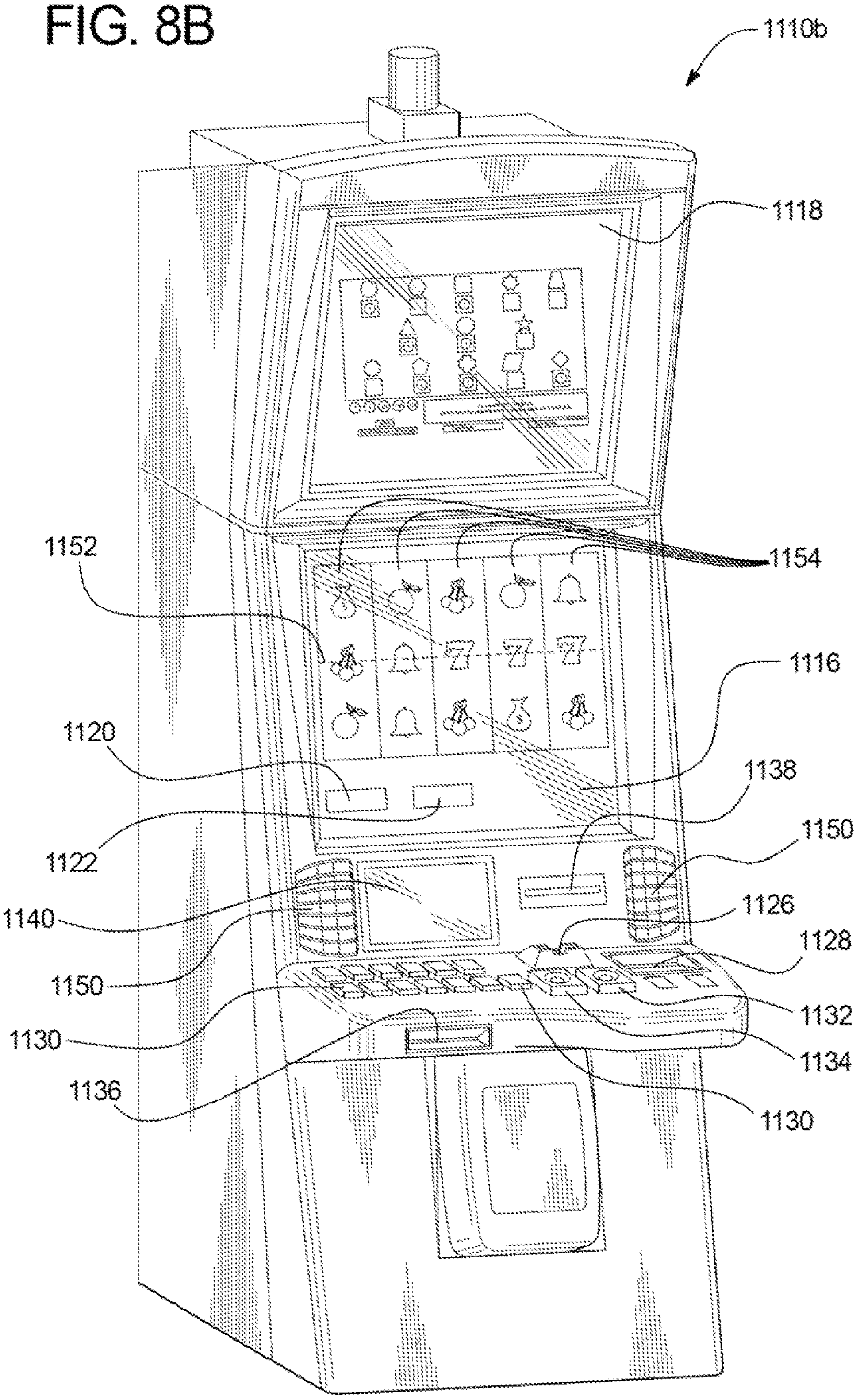

In various embodiments, the EGM includes one or more input devices. The input devices may include any suitable device that enables an input signal to be produced and received by the at least one processor of the EGM. The example EGM illustrated in FIG. 7B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 8A and 8B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 8A and 8B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 8A and 8B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 8A and 8B each include a card reader 1138. The card reader is configured to read a player identification card inserted into the card reader.

In various embodiments, the EGM includes one or more output devices. The example EGM illustrated in FIG. 7B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 8A includes a central display device 1116, a player tracking display 1140, a credit display 1120, and a bet display 1122. The example EGM illustrated in FIG. 8B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 8A and 8B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 8A and 8B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels. SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 8A and 8B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 8A and 8B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player: and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIG. 8B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

a plurality of input devices supported by the housing and including an acceptor;

at least one display device supported by the housing;

at least one processor; and at least one memory device storing a plurality of instructions which, when executed by the at least one processor, cause the at least one processor to:

establish a credit balance based at least in part on a monetary value associated with a physical item following receipt of the physical item by the acceptor;

cause the at least one display device to display a plurality of symbol display areas, wherein:

each of the symbol display areas is associated with one of a plurality of different independent symbol generators, each symbol display area is associated with one of a plurality of different individual volatilities determined based at least in part on the symbol generator displayed at that symbol display area, and at least two of the symbol display areas are associated with different individual volatilities such that if a first of the symbol display areas is associated with a first of the independent symbol generators, that first of the symbol display areas is associated with a first of the individual volatilities and if a second, different one of the symbol display areas is associated with the first of the independent symbol generators, that second, different one of the symbol display areas is associated with a second, different one of the individual volatilities;

receive a placement of an individual wager on one or more of the symbol generators in association with a play of a game, wherein the credit balance is decreasable based on the individual wagers placed and the play of the game has an overall volatility based on the individual volatilities associated with the symbol display areas at which the one or more individually wagered on symbol generators are displayed;

responsive to each of the symbol generators being individually wagered on, for each of the individually wagered on symbol generators:

randomly determine one or more symbols, cause the at least one display device to display the randomly determined one or more symbols in association with that symbol generator, determine, based on the displayed one or more symbols associated with that symbol generator and independent of the symbols displayed in association with any other individually wagered on symbol generators, any award for that symbol generator, and cause the at least one display device to display any determined award, the credit balance being increasable by any determined awards;

responsive to at least one but less than all of the symbol generators being individually wagered on, for each of the individually wagered on symbol generators:

randomly determine one or more symbols, cause the at least one display device to display the randomly determined one or more symbols in association with that symbol generator, determine, based on the displayed one or more symbols associated with that symbol generator and independent of the symbols displayed in association with any other individually wagered on symbol generators, any award for that symbol generator, and cause the at least one display device to display any determined award, the credit balance being increasable by any determined awards; and initiate a payout associated with the credit balance following receipt of an actuation of a cashout button.

2. The gaming system of claim 1, wherein each of the symbol display areas is associated with one of a plurality of different shapes, and when executed by the at least one processor, the plurality of instructions cause the at least one processor to, for each of the individually wagered on symbol generators and for the play of the game, determine any award for that symbol generator based, at least in part, on whether a shape of one of the one or more symbols displayed in association with that symbol generator corresponds to the shape associated with the symbol display area associated with that symbol generator.

3. The gaming system of claim 2, wherein, for each of the individually wagered on symbol generators, the shape of a symbol displayed in association with that symbol generator corresponds to the shape associated with the symbol display area associated with that symbol generator when the shapes of said displayed symbol and the symbol display area are the same.

4. The gaming system of claim 1, wherein each of the symbol generators is associated with the same average expected payback percentage.

5. The gaming system of claim 1, wherein each of the symbol display areas is associated with a different one of the plurality of different individual volatilities.

6. The gaming system of claim 1, wherein each of the symbol generators is associated with a different winnable award for said play of the game.

7. The gaming system of claim 1, wherein when executed by the at least one processor, the plurality of instructions cause the at least one processor to determine whether to provide an additional award by collectively evaluating the symbols displayed in association with the individually wagered on symbol generators.

8. A method of operating a gaming system, said method comprising:

receiving, by an acceptor, a physical item associated with a monetary value;

establishing, by at least one processor, a credit balance based at least in part on the monetary value associated with the received physical item;

displaying, by at least one display device, a plurality of symbol display areas, wherein:

each of the symbol display areas is associated with one of a plurality of different independent symbol generators, each symbol display area is associated with one of a plurality of different individual volatilities determined based at least in part on the symbol generator displayed at that symbol display area, and at least two of the symbol display areas being associated with different individual volatilities such that if a first of the symbol display areas is associated with a first of the independent symbol generators, that first of the symbol display areas is associated with a first of the individual volatilities and if a second, different one of the symbol display areas is associated with the first of the independent symbol generators, that second, different one of the symbol display areas is associated with a second, different one of the individual volatilities;

receiving a placement of an individual wager on one or more of the symbol generators in association with a play of a game, wherein the credit balance is decreasable based on the individual wagers placed and the play of the game has an overall volatility based on the individual volatilities associated with the symbol display areas at which the one or more individually wagered on symbol generators are displayed;

responsive to each of the symbol generators being individually wagered on, for each of the individually wagered on symbol generators:

randomly determining, by the at least one processor, and displaying, by the at least one display device, one or more symbols in association with that symbol generator;

determining, by the at least one processor, whether to provide an award for that symbol generator based on the displayed one or more symbols associated with that symbol generator and independent of the symbols displayed in association with any other individually wagered on symbol generators; and displaying, by the at least one display device, any determined award, the credit balance being increasable by any determined award;

responsive to at least one but less than all of the symbol generators being individually wagered on, for each of the individually wagered on symbol generators:

randomly determining, by the at least one processor, and displaying, by the at least one display device, one or more symbols in association with that symbol generator;

determining, by the at least one processor, whether to provide an award for that symbol generator based on the displayed one or more symbols associated with that symbol generator and independent of the symbols displayed in association with any other individually wagered on symbol generators; and displaying, by the at least one display device, any determined award, the credit balance being increasable by any determined award;

receiving an actuation of a cashout button; and initiating, by the at least one processor, a payout associated with the credit balance in response to the received actuation of the cashout button.

9. The method of claim 8, wherein each of the symbol display areas is associated with one of a plurality of different shapes, and further comprises causing the at least one processor to execute the plurality of instructions to, for each of the individually wagered on symbol generators and for the play of the game, determine any award for that symbol generator based, at least in part, on whether a shape of one of the one or more symbols displayed in association with that symbol generator corresponds to the shape associated with the symbol display area associated with that symbol generator.

10. The method of claim 9, wherein, for each of the individually wagered on symbol generators, the shape of a symbol displayed in association with that symbol generator corresponds to the shape associated with the symbol display area associated with that symbol generator when the shapes of said displayed symbol and the symbol display area are the same.

11. The method of claim 8, wherein each of the symbol generators is associated with the same average expected payback percentage.

12. The method of claim 8, wherein each of the symbol display areas is associated with a different one of the plurality of different individual volatilities.

13. The method of claim 8, wherein each of the symbol generators is associated with a different winnable award for said play of the game.

14. The method of claim 8, which is at least partially provided through a data network.

15. The method of claim 14, wherein the data network is an internet.

16. The method of claim 8, further comprising determining, by the at least one processor, whether to provide an additional award by collectively evaluating the symbols displayed in association with the individually wagered on symbol generators.

17. A gaming system comprising:

a processor; and a memory device storing a plurality of instructions which, when executed by the processor, cause the processor to:

cause a display device to display a plurality of symbol display areas, wherein:

each of the symbol display areas is associated with one of a plurality of different independent symbol generators, each symbol display area is associated with one of a plurality of different individual volatilities determined based at least in part on the symbol generator displayed at that symbol display area, and at least two of the symbol display areas are associated with different individual volatilities such that if a first of the symbol display areas is associated with a first of the independent symbol generators, that first of the symbol display areas is associated with a first of the individual volatilities and if a second, different one of the symbol display areas is associated with the first of the independent symbol generators, that second, different one of the symbol display areas is associated with a second, different one of the individual volatilities;

for a play of a game following a selection by a player of each of the symbol generators by placing an individual wager on each of the symbol generators, for each of the selected symbol generators:

randomly determine one or more symbols in association with that symbol generator, wherein the play of the game has an overall volatility based on the individual volatilities associated with the symbol display areas at which the selected symbol generators are displayed;

cause the display device to display the randomly determined one or more symbols in association with that symbol generator;

determine, based on the displayed one or more symbols associated with that symbol generator and independent of the symbols displayed on any other selected symbol generators, any award for that symbol generator; and cause the display device to display any determined award; and for a play of the game following a selection by the player of at least one but less than all of the symbol generators by placing an individual wager on at least one but less than all of the symbol generators, for each of the selected symbol generators:

randomly determine one or more symbols in association with that symbol generator, wherein the play of the game has an overall volatility based on the individual volatilities associated with the symbol display areas at which the selected symbol generators are displayed;

cause the display device to display the randomly determined one or more symbols in association with that symbol generator;

determine, based on the displayed one or more symbols associated with that symbol generator and independent of the symbols displayed on any other selected symbol generators, any award for that symbol generator; and cause the display device to display any determined award.

18. The gaming system of claim 17, wherein each of the symbol display areas is associated with one of a plurality of different shapes, and when executed by the processor, the plurality of instructions cause the processor to, for each of the selected symbol generators for the play of the game, determine any award for that symbol generator based, at least in part, on whether a shape of one of the one or more symbols displayed in association with that symbol generator corresponds to the shape associated with the symbol display area associated with that symbol generator.

19. The gaming system of claim 18, wherein, for each of the selected symbol generators, the shape of a symbol displayed in association with that symbol generator corresponds to the shape associated with the symbol display area associated with that symbol generator when the shapes of said displayed symbol and the symbol display area are the same.

20. The gaming system of claim 17, wherein each of the symbol generators is associated with the same average expected payback percentage.

21. The gaming system of claim 17, wherein each of the symbol display areas is associated with a different one of the plurality of different individual volatilities.

22. The gaming system of claim 17, wherein each of the symbol generators is associated with a different winnable award for said play of the game.

23. The gaming system of claim 17, wherein when executed by the processor, the plurality of instructions cause the processor to determine whether to provide an additional award by collectively evaluating the symbols displayed in association with the selected one or more symbol generators.

24. The gaming system of claim 17, wherein the display device comprises part of a mobile device.

25. The gaming system of claim 17, wherein when executed by the processor, the plurality of instructions cause the processor to communicate with the mobile device via a wireless network.

26. The gaming system of claim 17, which comprises an acceptor, wherein when executed by the processor, the plurality of instructions cause the processor to, responsive to a physical item being received via the acceptor, establish a credit balance based, at least in part, on a monetary value associated with the received physical item, and responsive to a cashout input being received, cause an initiation of any payout associated with the credit balance.

* * * * *